US008983069B2

(12) United States Patent
Merchan et al.

(10) Patent No.: US 8,983,069 B2
(45) Date of Patent: Mar. 17, 2015

(54) SYSTEM AND METHOD FOR COUNTER MODE ENCRYPTED COMMUNICATION WITH REDUCED BANDWIDTH

(71) Applicant: Robert Bosch GmbH, Stuttgart (DE)

(72) Inventors: Jorge Guajardo Merchan, Pittsburgh, PA (US); Attila A. Yavuz, Pittsburgh, PA (US); Benjamin Glas, Stuttgart (DE); Markus Ihle, Kusterdingen (DE); Hamit Hacioglu, Stuttgart (DE); Karsten Wehefritz, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 209 days.

(21) Appl. No.: 13/828,267

(22) Filed: Mar. 14, 2013

(65) Prior Publication Data
US 2014/0270163 A1 Sep. 18, 2014

(51) Int. Cl.
H04K 1/00 (2006.01)
H04L 9/06 (2006.01)
H04L 9/08 (2006.01)

(52) U.S. Cl.
CPC ............ H04L 9/0637 (2013.01); H04L 9/0869 (2013.01)
USPC .................................. 380/46; 380/37; 380/44

(58) Field of Classification Search
USPC .......................... 713/168; 380/37, 42–47, 278
See application file for complete search history.

(56) References Cited

U.S. PATENT DOCUMENTS

| 6,477,252 | B1 | 11/2002 | Faber et al. |
| 2004/0039908 | A1* | 2/2004 | Rose et al. ..................... 713/168 |
| 2008/0044012 | A1* | 2/2008 | Ekberg et al. ................... 380/30 |
| 2010/0111298 | A1* | 5/2010 | Krig ................................. 380/37 |
| 2010/0111308 | A1* | 5/2010 | Forsberg et al. ............... 380/278 |
| 2010/0158243 | A1* | 6/2010 | Tian et al. ........................ 380/37 |
| 2012/0087498 | A1 | 4/2012 | Chen |
| 2012/0189119 | A1* | 7/2012 | Brickell et al. ................. 380/44 |
| 2012/0250863 | A1 | 10/2012 | Bukshpun et al. |

FOREIGN PATENT DOCUMENTS

WO 2007059558 A1 5/2007

OTHER PUBLICATIONS

Ruhma Tahir et al, SCUR: Secure Communications in Wireless Sensor Networks using Rabbit, Proceedings of the World Congress on Engineering, 2008, vol. 1.*

(Continued)

Primary Examiner — Shewaye Gelagay
Assistant Examiner — Shanto M Abedin
(74) Attorney, Agent, or Firm — Maginot Moore & Beck LLP

(57) ABSTRACT

In a counter mode encryption scheme, a sending device sends a first message including first cipher text and a first counter used to generate the first cipher text to a receiving device for decryption. The sending device subsequently generates a second counter for generating second cipher text. The sending device sends a second message including the second cipher text and intermediate state data corresponding to a change between the first counter second counter to the receiving device for decryption. The intermediate state data are represented by a smaller number of bits than the first counter. The method enables improved counter mode encrypted communication in networks that lose one or more intermediate messages between the first message and the second message.

22 Claims, 9 Drawing Sheets

(56) References Cited

OTHER PUBLICATIONS

Jon Passki et al, An adaptive-ciphertext attack against "I⊕C" block cipher modes with an oracle, 2012.*

International Search Report and Written Opinion corresponding to PCT Application No. PCT/US2014/022441, mailed Jun. 30, 2014 (11 pages).

* cited by examiner

SYSTEM AND METHOD FOR COUNTER MODE ENCRYPTED COMMUNICATION WITH REDUCED BANDWIDTH

TECHNICAL FIELD

This patent relates generally to the fields of network communication, and, more particularly, to systems and methods for sending encrypted data through a network.

BACKGROUND

Many network applications send and receive data messages using an encryption scheme. As used herein, the term "encryption scheme" refers to a communication protocol that incorporates an encryption algorithm, which enciphers and deciphers data. The original data processed by an encryption algorithm are referred to as "plain text" and the encrypted data produced by the encryption algorithm are referred to as "cipher text." Encryption schemes optionally include additional functionality, such as authentication of encrypted messages.

Encryption schemes are broader than an encryption algorithm alone because an encryption algorithm using a single encryption key in isolation cannot generate a large number of messages in a cryptographically secure manner. Note that this limitation does not imply that the encryption algorithm is inadequate for use in sending highly secured communications. For example, even the Rijndael algorithm used in the Advanced Encryption Standard (AES), which is believed to be cryptographically secure for sensitive communications, cannot be used in isolation to guarantee secured communications indefinitely.

For an illustrative example of how even a strong encryption algorithm can be used in an insecure manner, imagine a scenario where a sender, Alice, wishes to send single letters of the English alphabet A-Z to a receiver, Bob. Alice and Bob share a 128-bit key encryption key that is kept secret so that an attacker Eve does not know what the key is. Alice uses the AES algorithm with the secret key to encrypt plain text data in 128-bit blocks. In this example, Alice encrypts a series of plain text letters "B", "O", and "B" to send to Bob. Note that since AES is a binary block cipher, Alice converts each letter to a binary representation, such as ASCII or Unicode, and then "pads" the individual letters with zeros or other appropriate padding data so that each plain text letter is represented by 128 bits of data to match the block size of the AES algorithm in this example. The following are contrived examples of cipher text messages sent to Bob, represented using hexadecimal numbers:
B→0xf3ea8951017b1797aaa01a3eldb054aa,
O→0x1737f10771fe999518c936eaf32b98cb, and
B→0xf3ea8951017b1797aaa01a3eldb054aa.

While the lengthy hexadecimal numbers for the cipher text listed above may appear to provide a great deal of security, note that the letter "B" is encrypted to the same cipher text value twice in the above example. Simplifying the above example yields B→B', O→O', B→B' where B' and O' are the cipher text values corresponding to the "B" and "O" plain text. Each of the other letters in the alphabet map to a single cipher text representation in the same manner.

If Alice sends Bob a non-trivial number of encrypted characters using the example described above, then the data include numerous repetitions of the same plain text letters and resulting cipher text messages that provide a great deal of information about the plain text to the attacker Eve. While the cipher text appears to be difficult to decrypt, the scenario described above is actually equivalent to a simple text-substitution cipher, such as cryptogram puzzles commonly published in newspapers, which can be solved by hand using frequency analysis and other known techniques. The weakness is not directly in the AES encryption algorithm, which Eve has not compromised, but in the fact that the encryption algorithm is deterministic, which is to say that the AES algorithm using one key always produces the exact same output given a single input. The deterministic nature of the encryption algorithm enables Bob to decrypt messages using the same key in a reliable manner, but requires a more sophisticated encryption scheme that goes beyond the encryption algorithm to prevent an attacker from extracting information from the cipher text.

Numerous encryption schemes that are known to the art prevent the types of attacks described above. While numerous variations exist, each of the schemes ensures that a given cryptographic key only encrypts any unique set of data a single time during the life of the key. Of course, Alice likely wants to send Bob the same piece of plain text, such as letters in the alphabet, numerous times without having to change the encryption key. The encryption schemes ensure that repeated messages including the same plain text are encrypted into cipher text messages that appear to be unpredictable and non-repeating to an attacker during the life of the cryptographic key.

The counter mode (CTR) encryption scheme is a commonly used encryption scheme that enables Alice to send the same plain text repeatedly while also ensuring that the encryption key does not encrypt a single set of data multiple times. In the CTR scheme, the encryption key does not encrypt the plain text directly, but instead encrypts a binary representation of a numeric counter. The encrypted counter is then used to transform the plain text, typically using a binary exclusive-or (XOR) operation, to generate the final cipher text for an encrypted message. The counter value is modified after each encryption operation, often by incrementing the counter value by 1. In a digital computer, the counter value is usually represented as an unsigned integer using a predetermined number of bits, such as 128 bits in one configuration, and the increment process uses modulo arithmetic so that if the counter value exceeds the maximum 128-bit number, the counter "wraps around" to zero and continues incrementing. The numeric range of the counter is sufficiently large to enable the encryption key to generate a large amount of encrypted data without encrypting the same counter value more than one time. If at some point the counter is exhausted, then the encryption scheme includes a method for both Alice and Bob to generate a new shared encryption key and the CTR mode begins again.

In the CTR encryption scheme, both Alice and Bob use a common counter value to encrypt and decrypt, respectively, each message. In existing systems, Alice typically sends Bob an initial counter value and Alice and Bob both increment the counter value in a predetermined manner. Note that Alice can send Bob the initial counter value in an unencrypted manner since Eve cannot decrypt the cipher text with only the initial counter value. In the CTR scheme, Alice can send Bob messages including any data without repetition. Thus, Alice can send repetitive plain text messages, such as A, A, A, and Eve sees a different cipher text corresponding to each plain text message without regard to the content of the plain text.

In addition to obscuring the plain text from Eve, the CTR scheme prevents Eve from performing a playback attack in which Eve records an earlier encrypted message and simply sends the message to Bob again, even if Eve does not know the plain text of the message. The playback attack fails because Bob modifies his counter after the first copy of the encrypted message arrives. When Eve sends the copy of the encrypted message, Bob has already updated the counter value so that the expected counter value for a new message does not correspond to the counter value used to generate the copied message, and Bob can identify that the copied message is invalid.

CTR mode encryption schemes are widely used in modern communication networks. For example, in an unrealistically ideal network, Bob receives every message that Alice sends without corruption and Bob receives multiple messages in the same order that Alice sent the multiple messages. In a more realistic high-speed data network, such as an Ethernet local area network (LAN), a high percentage of messages sent by Alice reach Bob, and higher-level communication protocols, such as the transmission control protocol (TCP), ensure that Alice retransmits the occasional lost message and that Bob receives the messages in the correct order. In the networks describe above, Alice can send Bob the initial counter value one time and both Alice and Bob update the counter value to maintain synchronization for a large number of encrypted messages.

CTR encryption schemes have drawbacks in situations where maintaining synchronization of the counter between the sender and the receiver is difficult. Unlike the network examples presented above, many data networks tend to lose a large number of messages and operate at comparatively low transmission data rates. Two examples of such networks are the controller area network (CAN) bus networks used in many automotive and industrial applications and low-power wireless sensor networks. These networks operate in environmentally hostile conditions where the rate of message loss is much higher than in the Ethernet networks described above. Additionally, the data rates in the CAN bus and wireless sensor networks are typically much slower than in high-speed data networks. For example, the CAN bus standard typically operates with a transfer rate of 250 kilobits of data per second, while Ethernet networks operate in a range of tens of megabits to 100 gigabits and beyond in various configurations.

When a message sent from Alice to Bob is lost, Bob does not update his copy of the counter when Alice sends a subsequent message to Bob. Thus, Alice and Bob lose counter synchronization when a message is lost. Additionally, since the unreliable networks operate at lower speeds, retransmitting messages to guarantee delivery or sending large amounts of redundant information is often impractical. In the past, lower reliability networks, such as CAN bus and wireless sensor networks, have simply sent messages in plain text instead of implementing strong encryption schemes. With the proliferation of network connectivity for different systems and threats from online attackers, however, encryption is becoming more important for use in network devices that have traditionally communicated using plain text. Consequently, improvements to CTR mode encryption schemes that provide improved encrypted communication in low reliability networks would be beneficial.

SUMMARY

In one embodiment, a method for encrypted communication between network devices has been developed. The method includes generating with a sending device a first counter value being represented by a first predetermined number of bits, generating with a cryptographic key and the first counter value in the sending device a first nonce, applying with the sending device the first nonce to first plain text data to generate first cipher text data, sending with the sending device a first message including binary data corresponding to the first cipher text data and the first counter value to a receiving device for decryption of the first cipher text data, modifying with the sending device the first counter value by a predetermined amount to generate a second counter value, identifying with the sending device intermediate state data corresponding to a change between the first counter value and the second counter value, the intermediate state data being represented by a second number of bits, the second number of bits being less than the first number of bits, generating with the cryptographic key and the second counter value in the sending device a second nonce, applying with the sending device the second nonce to second plain text data to generate second cipher text data, and sending with the sending device a second message including binary data corresponding to the second cipher text data and the intermediate state data to the receiving device for decryption of the second cipher text data.

In another embodiment, a method for encrypted communication between network devices has been developed. The method includes initializing with a sending device a pseudo-random number generator with state data generated in the sending device, the state data including a first predetermined number of bits, generating with the pseudo-random number generator in the sending device a first pseudo-random number, generating with a cryptographic key and the first pseudo-random number in the sending device a first nonce, applying with the sending device the first nonce to first plain text data to generate first cipher text data, sending with the sending device binary data corresponding to a first message including the first cipher text data and the state data to a receiving device for decryption of the first cipher text data, generating with the pseudo-random number generator in the sending device a second pseudo-random number, identifying with the sending device intermediate state data corresponding to a change in the state of the pseudo-random number generator during generation of the second pseudo-random number, the intermediate state data having a second number bits, the second number of bits being less than the first number of bits, generating with the cryptographic key and the second pseudo-random number in the sending device a second nonce, applying with the sending device the second nonce to second plain text data to generate second cipher text data, and sending with the sending device binary data corresponding to a second message including the second cipher text data and the intermediate state data to the receiving device for decryption of the second cipher text data.

In another embodiment, a method for encrypted communication between network devices has been developed. The method includes generating with a sending device a first counter value being represented by a first predetermined number of bits, generating with a cryptographic key and the first counter value in the sending device a first nonce, applying with the sending device the first nonce to first plain text data to generate first cipher text data, sending with the sending device a first message including binary data corresponding to the first cipher text data and the first counter value to a receiving device for decryption of the first cipher text data, modifying with the sending device the first counter value by a predetermined amount to generate a second counter value, generating with the sending device first error correction data corresponding to the second counter value, the first error correction data being represented by a second number of bits, the second number of bits being less than the first number of bits, generating with the cryptographic key and the second counter value in the sending device a second nonce, applying with the sending device the second nonce to second plain text data to generate second cipher text data, and sending with the sending device a second message including binary data corresponding to the second cipher text data and the first error correction data to the receiving device for decryption of the second cipher text data.

DETAILED DESCRIPTION

Figure 1:
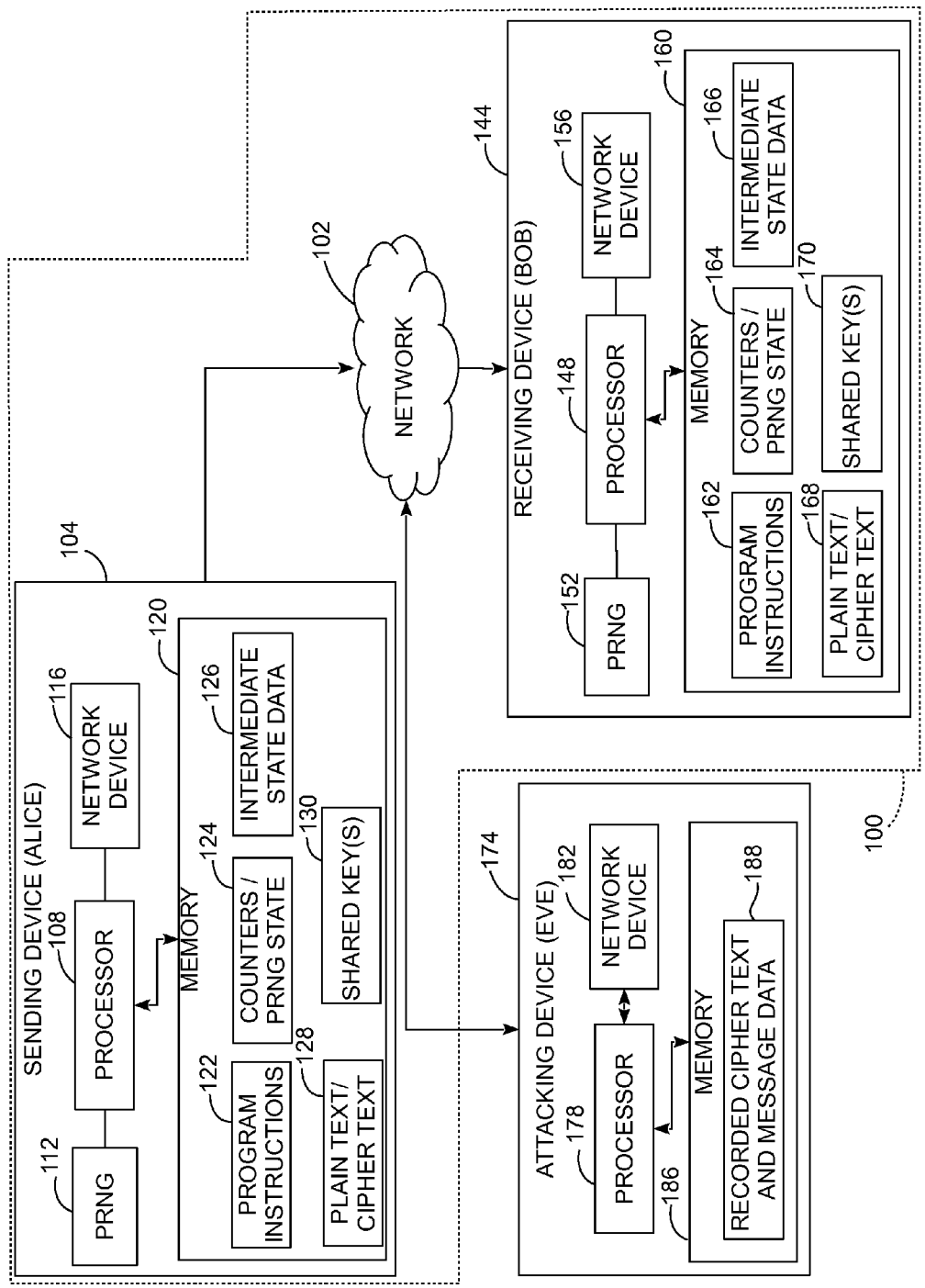
FIG. 1 is a schematic diagram of a network including a sending device that sends encrypted messages to a receiving device.

For the purposes of promoting an understanding of the principles of the embodiments described herein, reference is now be made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

As used herein, the term "binary data" refers to data where each datum in the data is represented with one of two values, typically expressed numerically as either a 0 or a 1, but also referred to as a "high" or "low" value or "on" and "off" states. As used herein, each datum in the binary data is referred to as a "bit." As used herein, a "message" sent between two network devices includes binary data formed from a plurality of bits. Each network device can send and receive data at a predetermined rate expressed as a number of bits per second. The systems and processes described below enable encrypted communication between devices with improved efficiency to reduce the total number of bits required for reliable transmission and reception of encrypted data in a network.

As used herein, the term "key" refers to a shared secret key used in a symmetric encryption scheme unless otherwise noted. As used herein, the term "symmetric encryption scheme" refers to an encryption scheme where a sending device and a receiving device both store copies of binary data corresponding to a shared key, and third-party devices, such as attackers, do not know the content of the key. As is known in the art, a key is formed from a predetermined number of bits with sufficient length to provide cryptographic security against envisioned attackers. For example, in existing symmetric cryptographic systems, key lengths of 128 and 256 bits are common, although longer key lengths can be used as well.

As used herein, the term "encryption algorithm" refers to a symmetric encryption algorithm that uses a key to either encrypt or decrypt binary data. The encryption process converts plain text to cipher text, and the decryption process reproduces the plain text from the corresponding cipher text. The embodiments described below illustrate "block" encryption algorithms that generate "blocks" of binary encrypted or decrypted data with a predetermined length, such as the length of the key. As described in more detail below, one advantage of a counter mode encryption scheme is that if the plain text includes fewer bits than the length of the block, then an encrypted message only needs to include the number of bits of cipher text that correspond to the plain text while omitting the remaining bits in the cipher text block.

As used herein, the term "nonce" stands for "number only once" and refers to a numeric value that is used only a single time during the operational life of a key in a symmetric key cryptographic scheme. As described in more detail below, counters and the output numbers from pseudo-random number generators are used as nonces in a symmetric key encryption scheme.

FIG. 1 depicts a sending device 104, receiving device 144, and an attacking device 174 that are communicatively coupled through a network 102. In FIG. 1, the sending device 104 is also referred to as "Alice" and the receiving device 144 is also referred to as "Bob" for illustrative purposes. The attacking device 174 is also referred to as Eve. The sending device 104, receiving device 144 and network 102 are part of a networked system 100, such as an in-vehicle control network or wireless sensor network. The attacking device 174 is not a legitimate part of the system 100, but is communicatively coupled to the network 102.

In the system 100, Alice 104 sends encrypted messages through the network 102 to Bob 144. Eve 174 eavesdrops on the messages and is assumed to have the ability to record all encrypted messages that Alice sends to Bob. As described below, the encryption schemes enable the sending device 104 to send encrypted messages to the receiving device 144 while preventing the attacking device 174 from decrypting the encrypted messages or sending false messages to the receiving device 144. Additionally, the processes described below enable efficient communication between Alice 104 and Bob 144 when some messages are lost during transmission through the network 102, and when the network 102 is a low-speed network.

In some embodiments, the network 102 is implemented with a shared communication medium. The term "shared communication medium" refers to networks in which multiple devices are connected to the network 102 and share the communication medium through a form of multiplexing, such as time, frequency, or code multiplexing. For example, CAN bus networks use a shared wire bus with multiple devices contending for use of the bus. In a CAN bus network, only one device uses the bus at a time to send a message. If multiple devices attempt to send messages simultaneously, a collision occurs and priority data in the messages sent using the CAN bus protocol are used to identify only one device that can continue sending a highest priority message. Another type of shared medium is the wireless spectrum used in a wireless data network.

In an embodiment where the network 102 includes a shared communication medium, other devices using the network wait for Alice 104 to send binary data in a message to Bob 144 before proceeding to send other messages. The length of time that Alice 104 uses the shared communication medium to send a message is proportional to the number of bits of binary data in the message. As described below, the system 100 is configured to enable Alice 104 to send encrypted messages while reducing the number of bits of data that Alice 104 sends to Bob 144 to ensure that Bob 144 decrypts messages using the same counter value that Alice used to encrypt the messages. Thus, the system 100 provides encrypted communications through a shared network medium with reduced overhead to the network and reduced sending and receiving times for Alice 104 and Bob 144, respectively.

The sending device 104 includes a processor 108, pseudo-random number generator (PRNG) 112, network device 116, and a memory 120. The processor 104 includes one or more integrated circuits configured as a central processing unit (CPU), microcontroller, field programmable gate array (FPGA), application specific integrated circuit (ASIC), or any other suitable digital logic device. The processor 108 optionally includes a hardware encryption engine that is configured to accelerate the encryption of plain text data or decryption of cipher text data. In another embodiment, the processor 108 performs encryption and decryption using only software instructions and general purpose processing hardware in the processor 108.

The PRNG 112 is implemented either using dedicated hardware that is integrated with the processor 108, as a software PRNG implemented with programmed instructions executed by the processor 108, or as a combination of dedicated hardware and software. In one embodiment, the PRNG 112 is a linear feedback shift register (LFSR) PRNG. The LFSR implementation of the PRNG provides a comparatively simple PRNG implementation that guarantees a predetermined period between a single number being generated more than once. As described below, in isolation the PRNG does not need to be considered cryptographically secure to enable encrypted communication between Alice 104 and Bob 144. That is to say, if Eve 174 recovers the state of the PRNG 112 and can duplicate the output of the PRNG 112, then Eve 174 is still unable to decrypt messages sent from Alice 104 to Bob 144, and is still unable to generate false messages that Bob 144 interprets as being sent from Alice 104. In some embodiments, however, the state of the PRNG is hidden from Eve 174 by encrypting the PRNG state when Alice 104 sends the PRNG state to Bob 144.

In FIG. 1, Eve 174 is another computing device with another processor 178, another network device 182 that is communicatively coupled to the network 102, and a memory 186, which stores recorded cipher texts and other message data 188. The network device 182 is configured to eavesdrop on messages sent through the network 102 and optionally send false messages to other devices, such as Bob 144. In some situations, Eve 174 is another device in the network 102 that has been compromised by an outside attacker (not shown). As described below, Alice 104 and Bob 144 implement CTR encryption schemes that prevent Eve 174 from decrypting the recorded cipher text data 188 using anything other than a best-known attack related to the encryption algorithm that Alice and Bob use. For example, if Alice 104 and Bob 144 use the Rijndael block encryption cipher, then Eve 174 can only decrypt the cipher text data through an attack on the Rijndael algorithm instead of attacking weaknesses in the CTR mode encryption scheme.

In the sending device 104, the network device 116 is configured to send and receive binary data through the network 102. The network device 116 can include both wired interface devices and wireless interface devices. For example, in an automotive embodiment the network interface device 116 is a controller area network (CAN) bus adapter that is configured to send and receive binary data using a wired CAN bus network in the automobile. In a wireless sensor network, the network device 116 transmits and receives binary data through an antenna (not shown). In a wireless mesh-network configuration, the sending device 104 communicates with the receiving device 144 directly through a point-to-point wireless transmission, or through a network of one or more additional devices that are communicatively coupled to each other.

In the sending device 104, the processor 108 is connected to the memory 120 to read binary data from the memory 120 and write binary data to the memory 120. The memory 120 includes stored program instructions 122, one or more counters or PRNG state data 124, intermediate state data 126, stored plain text and cipher text data 128, and one or more shared keys 130. In the embodiment of FIG. 1, the memory 120 includes both non-volatile data storage devices, such as solid state memory or magnetic disks, for long term data storage in the absence of electrical power, and volatile memory, such as static or dynamic random access memory (RAM) for short-term data storage during operation.

In the system 100, the receiving device 144 includes a processor 148, PRNG 152, network device 156, and memory 160 that are configured in substantially the same manner as the processor 108, PRNG 112, network device 116, and memory 120, respectively, in the sending device 104. The memory 160 includes stored program instructions 162, one or more counters or PRNG state data 164, intermediate state data 166, stored plain text and cipher text data 168, and one or more shared keys 170. In FIG. 1, the sending device 104 and receiving device 144 are configured in the same manner for illustrative purposes, but alternative embodiments incorporate a wide range of devices that include different hardware and software configurations. The different device embodiments can communicate using the shared cryptographic schemes described below in conjunction with common communication and encryption protocols.

Figure 2:
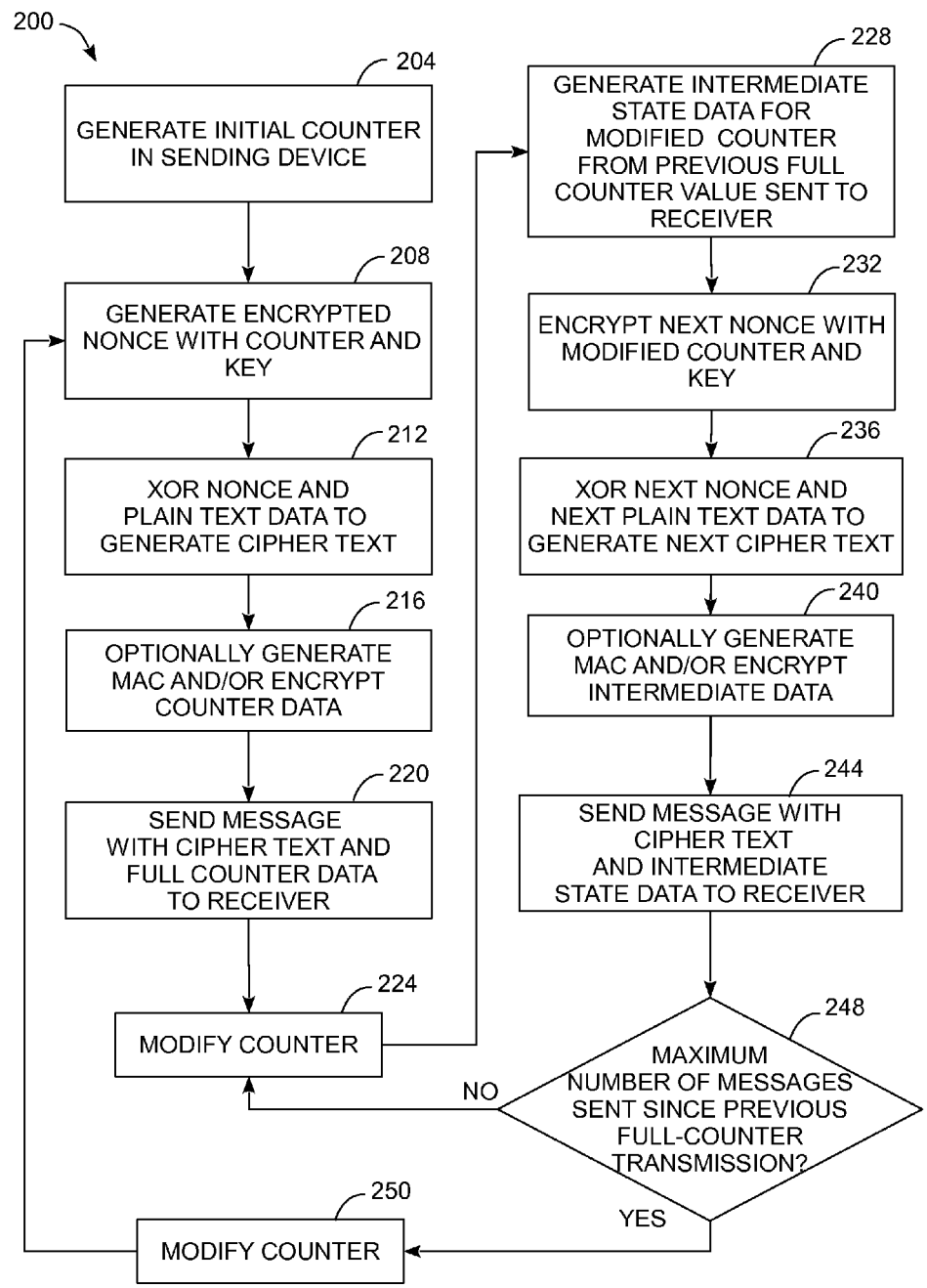
FIG. 2 is a block diagram of a counter mode encryption scheme used with the sending device in the network of FIG. 1.

FIG. 2 depicts a process 200 for counter mode (CTR) encrypted communication in a device that sends encrypted messages to a receiving device. FIG. 2 is described in conjunction with the embodiment of FIG. 1 and the sending device 104 for illustrative purposes. In the discussion below, a reference to the process 200 performing a function or action refers to one or more processors, such as the processor 108, executing programmed instructions stored in a memory to operate one or more components to perform the function or action. Process 200 is described in the context of a system where the sending device, such as Alice 104, and the receiving device, such as Bob 144, both have a shared cryptographic key stored in the key memories 130 and 170, respectively. Additionally, both devices implement a predetermined cryptographic algorithm such as, for example, the Rijndael algorithm used in AES, the Blowfish algorithm, the Twofish algorithm, or any other suitable symmetric encryption algorithm. The sending device and receiving device can use secure key generation and exchange techniques that are known to the art to generate the shared key and exchange the key so that the attacker Eve 174 does not have access to the shared key.

Process 200 begins with generation of an initial counter value in the sending device (block 204). The counter is a numeric value represented as a plurality of bits in the memory 124. The counter is represented by a number of bits that is sufficient to provide a number of unique counter values that enable the sending device 104 to send a large number of messages to the receiving device 144 without repeating the counter value. The counter can be initialized to any value, such as 0, or a randomized value.

The number of bits used to store the binary data representing the counter is sufficiently large so that a large number of encrypted blocks can be generated using only unique counter values while being small enough to enable efficient transmission of counter data through the network 102. In one configuration, the sending device 104 and receiving device 144 have a shared 128-bit key. The counter is also a 128-bit value that enables up to $2^{128}$ unique counter values to be used in generating $2^{128}$ blocks of data that are each 128 bits in length. A counter value that is represented by the same number of bits as the key may be larger than is required in certain network configurations, and transmission of the 128-bit value may increase the traffic through the network 102 unnecessarily. In another configuration using the 128-bit key, the counter is only 64 bits in size for a corresponding $2^{64}$ unique counter values. During block encryption or decryption, the 64-bit counter and a single 64-bit random number are concatenated to produce a 128-bit value for block encryption with the 128-bit key and the predetermined encryption algorithm. The 64-bit random number is shared between the sending device 104 and receiving device 144 and does not change during the life of the shared key. During process 200, the sending device 104 sends the binary data corresponding to the full counter value to the receiving device 144 periodically, and counter values that are represented with fewer bits are transmitted in a shorter amount of time.

Figure 9:
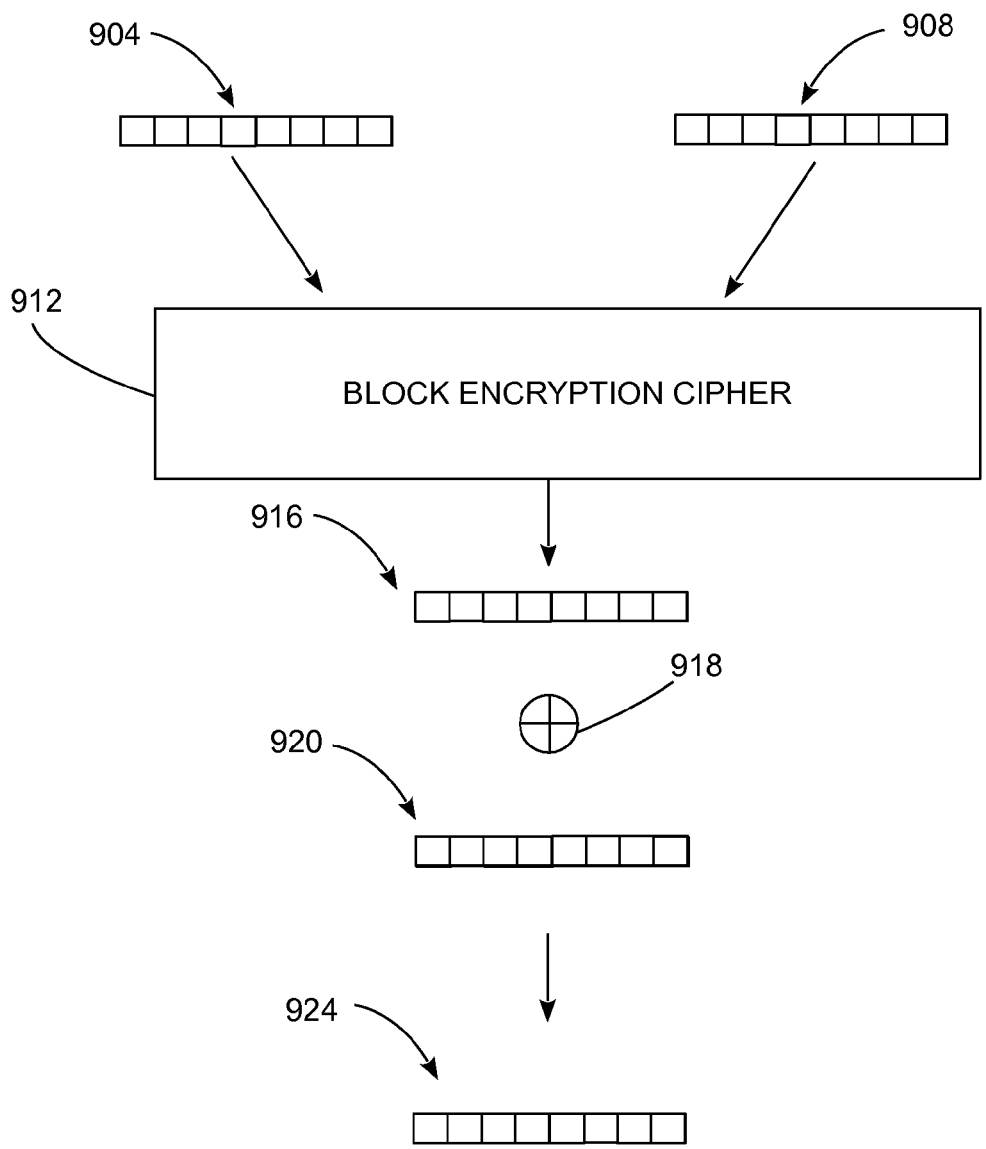
FIG. 9 is a diagram depicting data and operations performed in a prior art counter-mode encryption scheme.

Process 200 continues as the sending device 104 encrypts a nonce using the counter value and the key as inputs to a block encryption algorithm (block 208). Process 200 subsequently applies the nonce to a corresponding block of plain text using a logical exclusive or (XOR) operation to generate cipher text (block 212). The encryption process that is described with reference to the processing of blocks 208 and 212 is known to the art and is depicted diagrammatically in FIG. 9. In FIG. 9, the binary data representing the key 904 and counter 908 are the inputs to the block encryption cipher algorithm 912 that is executed by the processor 108 in the sending device 104. As described above, the key 904 and counter 908 each include the same number of bits, such as 128 bits, and the block cipher 912 generates a nonce 916 that also includes 128 bits of data. The processor 108 applies the nonce 916 to plain text data 920 with an XOR operation 918 to generate cipher text 924.

During process 200, an encrypted message can include plain text data 920 with more or fewer bits than are in the 128 block depicted in FIG. 9. If the plain text includes more data than can be accommodated by a single block, then process 200 generates multiple cipher text blocks while incrementing the counter 908 during the generation of each block so that the block encryption cipher 912 only encrypts a particular counter value one time. Some combinations of key length and network communication protocols only require generation of a single block of cipher text in a message. For example, the extended frame format CAN bus protocol includes variable length messages with a maximum size of 128 bits, which can be accommodated by a single block of a 128-bit block cipher.

One characteristic of CTR mode encryption schemes is that the cipher text can be shorter than the block length of the block cipher 912 without compromising the security of the CTR mode scheme. If the plain text are shorter than the length of the block or if a longer plain text data set includes a tail segment that is not evenly divisibly by the block size, then only the portion of the nonce 916 that corresponds to the plain text data bits 920 is XORed with the plain text data 920 to produce the cipher text 924. For example, an extended frame CAN bus message can be shorter than 128 bits, such as a 98-bit plain text 920. Then the bits of the plain text 920 are XORed with the 98 least significant bits in the nonce 916 to generate 98 bits of cipher text 924. Thus, the CTR mode encryption scheme described in process 200 generates a cipher text including the same number of bits that are present in the plain text.

Referring again to FIG. 2, the sending device 104 optionally generates a message authentication code for the encrypted message, encrypts the counter data, or both using a different encryption key than the key used to encrypt the plain text (block 216). As is known in the art, the shared encryption key can act as a parent key that generates two or more sub-keys. In one configuration, a first sub-key performs plain text encryption, and a second sub-key generates message authentication codes (MACs), encrypts the binary data representing the full counter value, or both. In the process 200, the MAC is generated for a concatenation of the cipher text in the encrypted message and either plain text counter data or the encrypted counter data. The receiving device subsequently validates the authenticity of the encrypted message using the MAC. Additionally, if the counter data are encrypted, the receiving device decrypts the counter data. While process 200 optionally encrypts the initial counter data, the attacking device 174 can receive the plain text data corresponding to the initial counter value without compromising the secrecy of cipher text data that are generated with the key and the initial counter value during process 200.

After cipher text data are generated, the sending device 104 sends a message including the binary data corresponding to the cipher text and the full counter data to the receiving device 144 (block 220). The message includes binary data corresponding to the MAC, if one is generated, and the full counter value data are either sent as plain text or optionally as cipher text. The full counter value includes all of the binary data representing the counter. For example, if the counter is a 64-bit counter, then the binary counter data include 64 bits. The full counter binary data increase the size of the transmitted message. In network configurations that send comparatively short messages, the full 64-bit counter value represents a considerable portion of the total message size and adds to the time required for the sending device 104 to send the message through the network 102.

After generation of the cipher text for one message, the sending device 104 modifies the counter value (block 224). In one configuration, the processor 108 in the sending device increments the counter by 1 to generate a new counter value. As is known in the art, the counter is typically modified using a modulo arithmetic operation, where the modulo refers to a remainder of a number after dividing the number by a modulo factor. Using a trivially small 3-bit unsigned counter with modulo 8 arithmetic as an example, a counter value of 7 (binary 111) is incremented by the counter to produce a value of 8 (binary 1000). The modulo arithmetic, however, divides the result by 8 and the counter value is set to the remainder of 8 divided by 8, which is zero, and the counter effectively "wraps around" during operation. In alternative embodiments, the counter is incremented or decremented by predetermined values other than 1, and any method of modifying the counter that produces non-repeating counter values and that generates synchronized counter values in both the sending device 104 and the receiving device 144 can be used during process 200.

Process 200 continues with generation of intermediate state data for the modified counter with reference to the previous full value of the counter that was last sent with an encrypted message (block 228). The intermediate state data correspond to changes to the counter in the sending device 104 that occur after the sending device 104 sends the full counter value to the receiving device 144. The intermediate state data are represented by a smaller number of bits of binary data than the number of bits that represent the full counter.

Intermediate state data are sent with some or all of the messages sent after the sending device 104 sends the full counter value data to the receiving device 144. The intermediate state data enable the receiving device 144 to modify the counter value 164 stored in the receiving device memory 160 to synchronize the counter in the receiving device 144 with the counter in the sending device 104. For example, if the sending device 104 sends one message that is lost in the network 102 or corrupted upon being received by the receiving device 144, then the intermediate state data in a subsequent message enable the receiving device 144 to synchronize the counter with the counter in the sending device 104 to enable decryption of the subsequent message. Without the intermediate state data, the receiving device 144 uses an incorrect counter value for decryption in situations where the sending device 104 sends one or more messages that do not successfully reach the receiving device 144. As described below, the intermediate state data include a smaller number of bits than the full counter value data to reduce the time required to send a message from the sending device 104, and to reduce the additional traffic through the network 102 due to the binary data representing counters.

In one embodiment, the intermediate state data include binary data representing a numeric difference between the modified counter value and the full counter value sent with a previous message. In one example, the 64-bit counter sent to the receiving device 144 has a hexadecimal value of 0x0A0B0C0D0E0F0102. The sending device 104 increments the counter by 1 during encryption of plain text data for three subsequent messages. The sending device 104 increments the counter by 1 prior to encrypting plain text for a fourth message and generates intermediate state data of: 0x04, which indicates that the counter has been incremented four times. The intermediate state value is represented with a smaller number of bits than the full counter. In one configuration, a 64-bit counter is incremented by 1 between each encryption operation. The sending device 104 generates intermediate state data using a 5-bit representation of the intermediate values. Thus, the sending device 104 can represent 32 different intermediate values ($2^5$) in the 5 bits of intermediate state data.

In another embodiment, the intermediate state data include a least significant number of bits from the counter that are modified after the sending device 104 sends the full-value of the counter to the receiving device 144. For example, the intermediate state data are the 5 least-significant bits of the full counter in one configuration. At least one of the least-significant bits changes after the counter is modified, although the value of the least significant bits does not necessarily correspond to the difference between the previously transmitted full counter value and the modified counter value.

In still another embodiment, the sending device 104 generates the intermediate state data with reference to a number of messages that have been sent since the previous transmission of the full counter value. Using the number of messages that have been sent instead of sending the difference between the current counter value and the previously sent full counter value can be useful in configurations in which the sending device 104 modifies the counter in other ways than incrementing the counter by one (1) after encrypting each set of plain text data. For example, if the counter value is incremented using the output of a PRNG, such as the PRNG 112 in the sending device 104, then the intermediate state data represent a number of different pseudo-random numbers that the PRNG has generated to modify the counter value in the sending device 104 instead of the numeric difference between the current value of the counter and the previously transmitted value of the counter. The receiving device 144 modifies the counter 164 in the memory 160 in the same manner as the sending device 104 based on the number of intermediate messages to maintain synchronization with the counter in the sending device 104. In each of the embodiments described above, the intermediate state data are represented using a smaller number of bits than are used to represent the full counter value.

Referring again to FIG. 2, process 200 continues as the processor 108 in the sending device 104 encrypts another nonce using the modified counter value and the shared key (block 232). The processor 108 XORs the nonce with plain text data in a next data message (block 236) and optionally generates a MAC, encrypts the intermediate state data, or both with a second shared key (block 240). The processing described with reference to blocks 232-240 is similar to the processing described with reference to blocks 208-216, but the processor 108 uses the modified counter to generate a different nonce and the sending device 104 generates a MAC for the message and encrypted binary data for the intermediate state data instead of for the full value of the counter.

After generating the intermediate state data, cipher text, and optional MAC data, the sending device 108 sends the cipher text for the next message and the intermediate state data to the receiving device 144 (block 244). Process 200 continues with the processing described with reference to blocks 224-244 above until a maximum predetermined number of messages are sent that include only the intermediate state data instead of the full counter data (block 248). Using the 64-bit counter and 5-bit intermediate state data described above, the sending device 104 sends up to 32 ($2^5$) messages that include the 5-bit intermediate state data to the receiving device 144. Each message includes a different intermediate state data value, and if one or more of the messages do not reach the receiving device 144 successfully, then the receiving device 144 synchronizes the counter data 164 with the counter data 124 in the sending device 104 using the intermediate state data in each message.

The size of the intermediate state data reduces the total amount of data the sending device 104 needs to send to the receiving device 144. Using the example of the 64-bit counter and a 5-bit intermediate state data field, the sending device sends a total of 33 messages with the full 64-bit counter being sent once (64 bits) and an additional 160 bits of intermediate state data being sent for 32 additional messages with 5 bits of intermediate state data in each message. Thus, in process 200 the sending device sends 224 bits of data to maintain counter synchronization over the course of 33 messages. In comparison, if the sending device 104 sent the entire 64-bit counter with each message, then the sending device would send 2,112 bits of counter data for the same 33 messages. Consequently, sending intermediate state data instead of the full counter with each message greatly reduces the total number of bits of binary data that the sending device 104 sends to the receiving device 144 while also enabling the receiving device 144 to maintain counter synchronization if one or more messages fail to reach the receiving device 144.

During process 200, the sending device 104 continues to send encrypted messages that include the intermediate state data as described above with reference to the processing of blocks 224-244 until a predetermined maximum number of messages have been sent (block 248). As described above, the predetermined maximum number of messages is typically the total number of unique intermediate states that can be represented by the intermediate state data, such as 32 values for 5-bits of intermediate state data. Process 200 subsequently modifies the counter (block 250) in the same manner described above with reference to the processing of block 224, and returns to the processing described with reference to block 208 to generate another encrypted message that includes the full counter value. Process 200 continues as the sending device 104 sends additional messages to the receiving device 144. If the sending device 104 eventually sends messages using every possible counter value, then the sending device 104 generates a new key and the sending device 104 and receiving device 144 use the new shared key to continue communication as described in process 200.

In the description of process 200 above, the sending device 104 encrypts messages and updates the counter as needed when sending each encrypted message to the receiving device 144. In another configuration, the sending device 104 generates a plurality of encrypted messages and stores the encrypted messages as cipher text 128 in the memory 120. For example, if the sending device 104 can send three different messages A, B, and C to the receiving device 144, then the sending device encrypts the three different messages A, B, and C using only one nonce generated from the encryption algorithm and a single counter value. The encrypted messages A, B, and C are stored in the cipher text memory 128 until the sending device 104 sends the next message. At that time, the sending device 104 simply retrieves the appropriate cipher text for A, B, or C from the cipher text memory 128 and sends the message including either the full counter value or intermediate state data stored in the intermediate state data memory 126. The sending device 104 erases the remaining alternative messages from the cipher text memory 128 to prevent disclosure of multiple cipher text messages that are generated with a single nonce to the attacking device 174. In some configurations the sending device 104 generates a series of potential encrypted messages using multiple counter values prior to sending the messages. For example, the sending device 104 generates sets of encrypted messages $A_0$, $B_0$, and $C_0$; $A_1$, $B_1$, and $C_1$; and $A_2$, $B_2$, and $C_2$ using nonces generated from three successive counters. The sending device 104 stores the three sets of encrypted messages in the cipher text memory 128 in association with the full counters 124 or intermediate state data 126 associated with each set of encrypted messages and sends only one message from each of the message sets to the receiving device 144.

Figure 3:
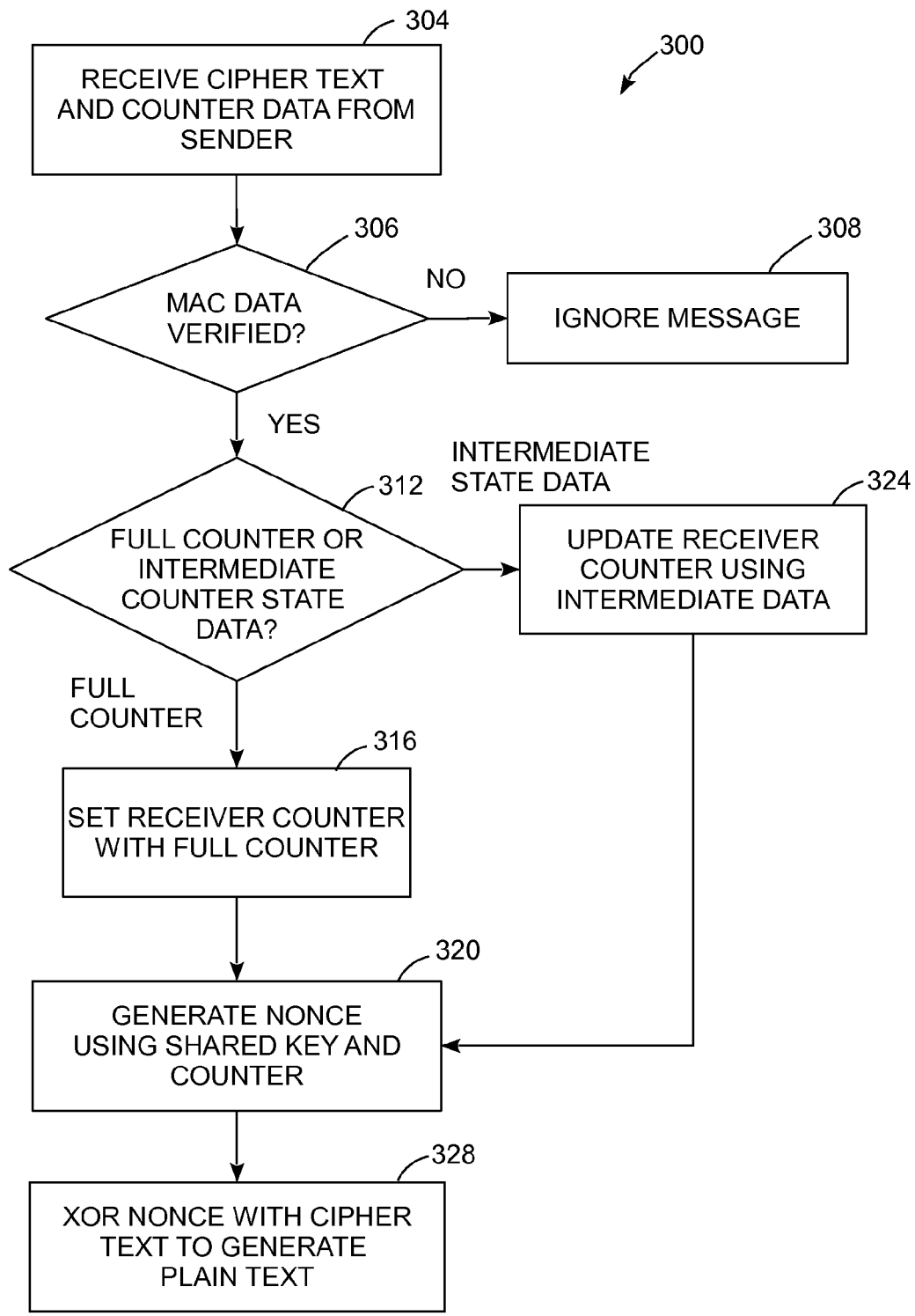
FIG. 3 is a block diagram of a counter mode decryption scheme used with the receiving device in the network of FIG. 1.

In the system 100, the sending device 104 sends encrypted messages to the receiving device 144 as described above with reference to the process 200. The receiving device 144 decrypts the encrypted messages to recover the plain text data in each message. FIG. 3 depicts a process 300 for decryption of the encrypted messages. FIG. 3 is described in conjunction with the embodiment of FIG. 1 and the receiving device 144 for illustrative purposes. In the discussion below, a reference to the process 300 performing a function or action refers to one or more processors, such as the processor 148, executing programmed instructions stored in a memory to operate components to perform the function or action.

Process 300 begins when the network device 156 in the receiving device 144 receives an encrypted message including cipher text and binary counter data from the sending device 104 (block 304). If the cipher text message includes an optional MAC, then the receiving device 144 verifies the contents of the encrypted message using the MAC (block 306). The processor 148 in the receiving device 144 verifies the MAC using a shared verification key stored in the key memory 170 to verify that the contents of the message correspond to the MAC. The verification key is different than the shared encryption/decryption key that the receiving device 144 uses to decrypt the contents of the message. In one embodiment, the verification keys and decryption keys are two sub-keys that are generated from a single parent key that is shared between the sending device 104 and receiving device 144. In some embodiments, the message includes counter data that are encrypted using the verification key, and the receiving device decrypts the counter data using the verification key as well. If the MAC does not properly correspond to the message, then the receiving device ignores the message (block 308) and does not continue with further processing and decryption of the message. In some embodiments, the receiving device 144 sends a message to the sending device 104 indicating that a received message did not correspond to the MAC. The sending device 104 optionally retransmits the corrupted message, or sends a new message including the full counter data to the receiving device to re-synchronize the state of the two devices.

If the MAC data are verified, then process 300 continues as the receiving device 144 identifies whether the message includes either the full counter data or intermediate state data corresponding to the counter (block 312). As described above, the full counter data include a larger number of bits to represent the full counter and the intermediate state data include a smaller number of bits to represent modifications to the counter in the sending device 104 that have occurred since the previous transmission of the full counter. In a configuration where the full counter includes 64 bits of data and the intermediate state data include 5 bits of data, the processor 148 can distinguish between a full counter or intermediate state data with reference to the length of the counter data, or with reference to additional flags and option data that are included in the message.

If the message includes the full data corresponding to the counter in the sending device 104, then the receiving device 144 sets an internal counter, stored in the counter memory 164, to the value of the full counter data (block 316). If the message includes the intermediate state data, then the processor 148 modifies a counter that is stored in the counter memory 164 with reference to the contents of the intermediate state data (block 324). For example, in one embodiment the intermediate state data include the numeric difference between the counter value used by the sending device 104 to generate the cipher text in the message and the value of the counter that was sent to the receiving device 144 as part of a previous message. The receiving device 144 modifies the counter in the counter memory 164 to be the sum of the previously received full counter value and the numeric value of the intermediate state data. The intermediate state data enable the receiving device 144 to maintain synchronization between the counter stored in the counter memory 164 and the counter that the sending device 104 uses to generate the cipher text in the message even if one or more earlier messages sent from the sending device 104 do not reach the receiving device 144.

Process 300 continues as the receiving device uses the counter, the shared encryption key, and the encryption algorithm to generate the same nonce that the sending device used to encrypt the message (block 320). In the CTR mode encryption scheme described with reference to FIG. 2 and FIG. 3, the sending device 104 and the receiving device 144 both use the shared key and the counter value to perform an encryption operation to generate the nonce.

In process 300, the processor 148 in the receiving device 144 does not perform a decryption operation directly, but instead generates the nonce using the encryption operation with the same key and counter that the sending device 104 uses during encryption. To decrypt the cipher text data, the receiving device 144 applies the generated nonce to the cipher text data in an XOR operation (block 328). As is known in the art, the XOR operation using the nonce applied to the plain text generates the cipher text, and another XOR operation using the same nonce applied to the cipher text returns the plain text. For example, if the plain text is "0110" and the nonce is "1011" then the sending device 104 generates cipher text: 0110⊗1011→1101. The receiving device 144 generates the same nonce, "1101," and XORs the cipher text with the nonce to recover the plain text: 1101⊗1011→0110.

In the system 100, the binary data in messages sent from the sending device 104 to the receiving device 144 traverse the network 102. In some networks, the message data travel through a single medium, such as a wire, fiber-optic connection, or air, to the receiving device 144. In other networks, one or more intermediate devices, such as switches or routers, copy the message data and forward the message until the message reaches the receiving device 144. In either type of network, the contents of a message may be corrupted during transmission to the receiving device. Some existing communication protocols use various data integrity schemes, such as message digests, checksums, parity bits, and the like, to enable a receiving device to verify whether the contents of a message have been corrupted during transmission. For example, the optional use MAC data in the encrypted messages described above with reference to processes 200 and 300 enables the receiving device 144 to verify that a message has not been altered since being sent from the sending device 104. Some network configurations, however, do not include additional message content verification techniques.

Figures 4A, 4B:
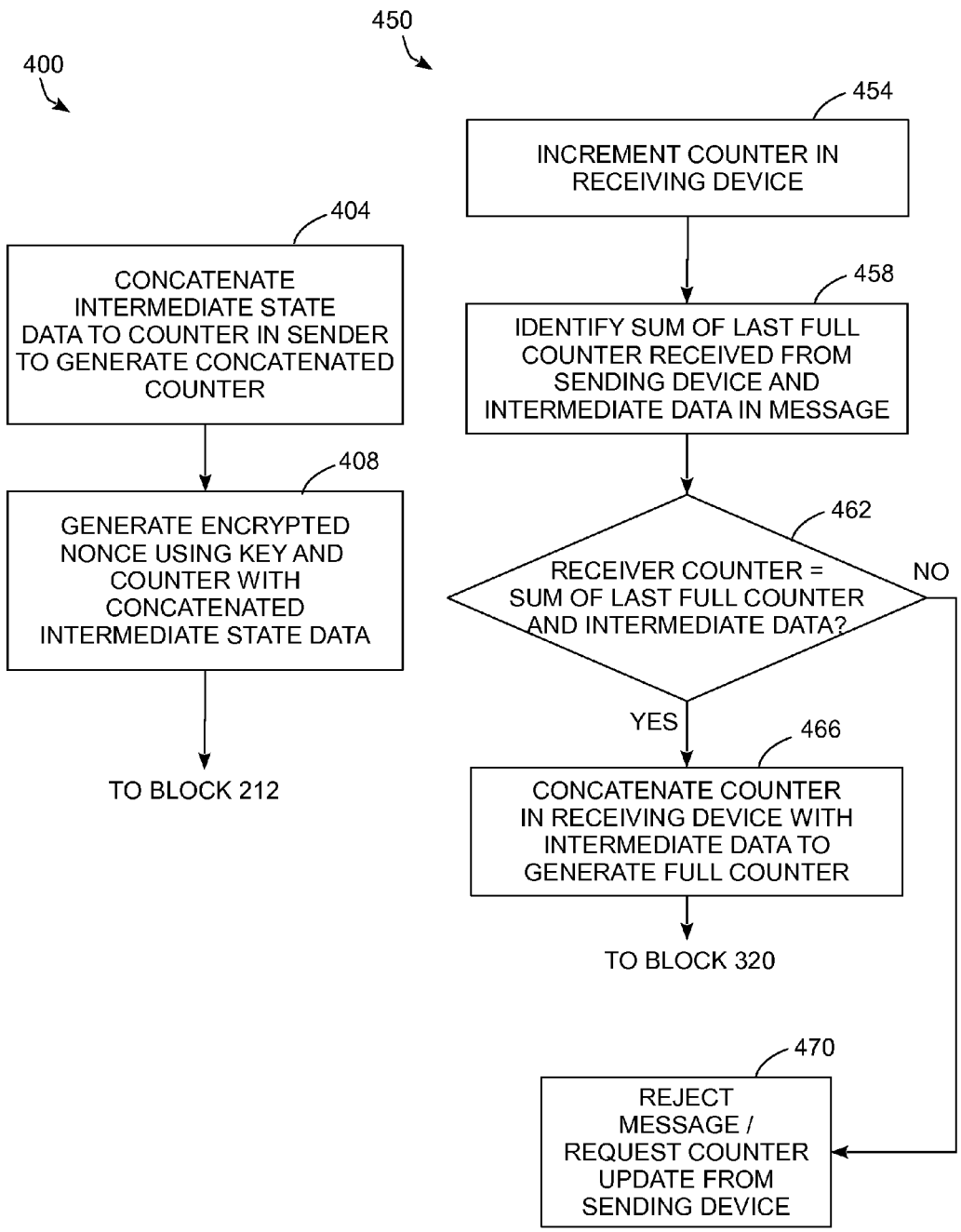
FIG. 4A is a block diagram of an extension to the counter mode encryption scheme of FIG. 2 used by the sending device.
FIG. 4B is a block diagram of an extension to the counter mode decryption scheme of FIG. 3 used by the receiving device.

In the system 100, FIG. 4A depicts a process 400 that the sending device 104 performs to incorporate message verification data into encrypted messages, and FIG. 4B depicts a process 400 that the receiving device 144 performs to verify the contents of the message. Process 400 is described as an extension to process 200, and process 450 is described as an extension of process 300. In the discussion below, a reference to the processes 400 or 450 performing a function or action refers to one or more processors, such as the processors 108 and 148, executing programmed instructions stored in a memory to operate components to perform the function or action.

In process 400, the processor 108 in the sending device 104 concatenates the intermediate state data to a truncated counter value to form the full counter for each message (block 404). For example, in an embodiment where the full counter is 64 bits and the intermediate data are represented by 5 bits, the sending device 104 generates a 59-bit counter value and concatenates the 5 bits representing the intermediate state to the 59-bit counter value to generate a full 64-bit counter. The full 64-bit counter is then encrypted using the block cipher and the key to generate the encrypted nonce (block 408). After generating the nonce, the sending device 104 returns to the processing described above with reference to block 212 in the process 200. The concatenation of the intermediate state data to the counter ensures that the sending device 104 generates the nonce using the same intermediate state data that are sent with each message.

Referring to FIG. 4B, the receiving device 144 performs process 450 to decrypt cipher text that is generated using the counter value with the concatenated intermediate state data during process 400. Process 450 is used in the processing of encrypted messages that include only the intermediate state data corresponding to the counter in the sending device 104. Process 450 begins once the receiving device 144 receives cipher text in a message from the sending device, as described above with reference to the processing of block 304 in the process 300. The receiving device 144 increments the counter value stored in the receiving device memory 164 in the same manner as the sending device (block 454). For example, the receiving device 144 includes a 59-bit counter value stored in the memory 164 that is synchronized with the counter value that the sending device 104 uses to encrypt the message. The receiving device 144 increments the 59-bit counter by one modulo $2^{59}$ when the next encrypted message is received to remain synchronized with the sending device counter in the memory 124 of the sending device 104.

Process 450 continues as the receiving device 144 identifies the sum of the last full counter value received from the sending device 104 and the intermediate data that are included with the cipher text message (block 458). As described above, the sending device 104 only sends the full counter value to the receiving device 144 periodically to reduce the number of bits used to send the encrypted messages. The receiving device 144 stores the last full-counter value received from the sending device 104 in the counter memory 164. In an embodiment with a 59-bit counter value and 5-bit intermediate data, the receiving device 144 adds the intermediate data, with a value of 0 to 31, to the previously received 59-bit counter value modulo $2^{59}$ to generate the sum.

During process 450, if the value of the counter in the receiving device is equal to the sum of the last full counter and the intermediate data in the received message (block 462), then the processor 148 identifies the state of the counter in the receiving device 144 as corresponding to the state of the counter in the sending device 104. The processor 148 generates the full counter value by concatenating the receiver counter with the intermediate state data (block 466) and the receiving device 144 returns to the processing described above with reference to block 320 in the process 300. In one embodiment, the processor 148 generates a 64-bit full counter value using the 59-bit counter stored in the memory 164 concatenated with the 5-bit intermediate state data that are received with the encrypted message.

During process 450, if the value of the counter in the receiving device is not equal to the sum of the last full counter and the intermediate data in the received message (block 462), then the receiving device rejects the encrypted message (block 470). For example, the sending device 104 and receiving device 144 begin with proper counter synchronization. The sending device 104 proceeds to send two encrypted messages to the receiving device 144. The first encrypted message is lost in the network 102, but the second message reaches the receiving device 144. Because the receiving device 144 only increments the receiving counter once when the second message is received, the counter in the receiving device 144 does not correspond to the sum of the previously synchronized full counter and the intermediate data in the second message. The receiving device 144 ignores the second message, and optionally sends a response message to the sending device 104 to request that the sending device retransmit the full value of the counter in a subsequent message or retransmit the first message that failed to reach the receiving device 144.

Figure 5:
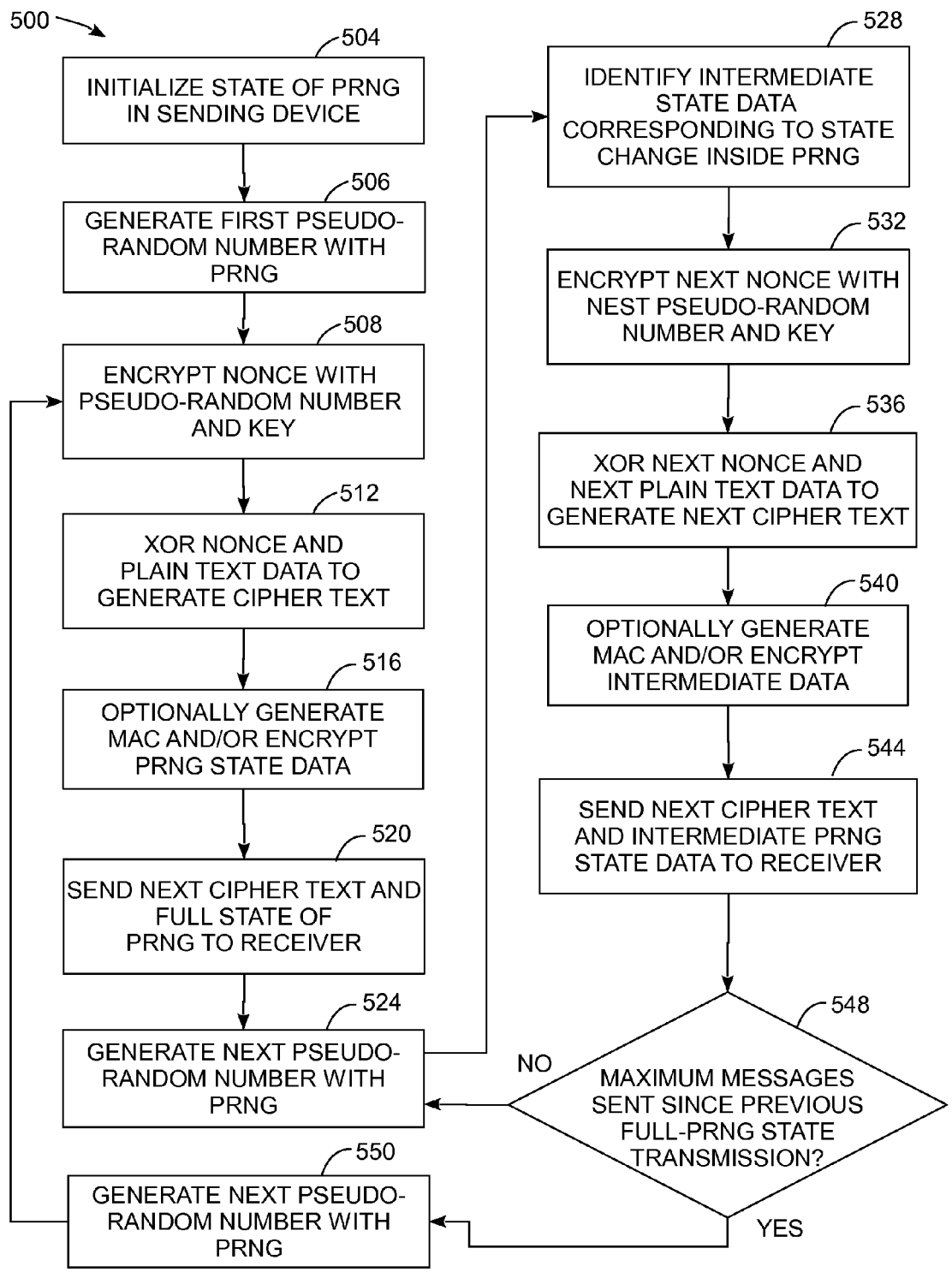
FIG. 5 is a block diagram of another counter mode encryption scheme used with the sending device in the network of FIG. 1.

FIG. 5 depicts a process 500 for counter mode (CTR) encrypted communication in a device that sends encrypted messages to a receiving device. The process 500 uses pseudo-random number generators to generate counter values instead of incrementing a counter after encrypting a nonce for each set of plain text. FIG. 5 is described in conjunction with the embodiment of FIG. 1 and the sending device 104 for illustrative purposes. In the discussion below, a reference to the process 500 performing a function or action refers to one or more processors, such as the processor 108, executing programmed instructions stored in a memory to operate components to perform the function or action.

Process 500 is described in the context of a system where the sending device, such as Alice 104, and the receiving device, such as Bob 144, both have a shared cryptographic key stored in the key memories 130 and 170, respectively. Additionally, both devices implement a predetermined cryptographic algorithm such as, for example, the Rijndael algorithm used in AES, the Blowfish algorithm, the Twofish algorithm, or any other suitable symmetric encryption algorithm. The sending device and receiving device can use secure key generation and exchange techniques that are known to the art to generate the shared key and exchange the key so that the attacker Eve 174 does not have access to the shared key.

Process 500 begins with initialization of a pseudo-random number generator (PRNG) in the sending device (block 504). In the system 100, the PRNG 112 in the sending device 104 is initialized with a vector of bits representing an internal state of the PRNG. The PRNG state bits are stored in registers within the PRNG 112, or in the PRNG state memory 124 in software PRNG embodiments. While various types of PRNG can be used with process 500, the sending device 104 and receiving device 148 in the system 100 use a linear feedback shift register (LFSR) for the PRNG. The number of bits in the state vector corresponds to the number of bits of output that the LFSR generates for each pseudo-random output number. For example, an LFSR that generates 64-bit pseudo-random output data is initialized with a 64-bit state vector.

As is known in the art, the LFSR is not necessarily considered as a secure PRNG for many uses in cryptographic systems. For example, an outside observer can reconstruct the internal state of an LFSR after observing $2m$ pseudo-random numbers that the LFSR generates, where m is the number of bits of state in the LFSR. The outside observer can predict future outputs from the LFSR after identifying the internal state of the LFSR. Using the 64-bit LFSR as an example, the internal state of the LFSR can be reconstructed after observing 128 sequential outputs of the LFSR. Another deficiency of an LFSR in generation of truly random numbers is that the LFSR only outputs a given number one time during a predetermined cycle period for the LFSR. Other PRNG implementations can generate individual numbers more than one time during a period, which increases the apparent randomness of the PRNG output.

The deficiencies described above for an LFSR in some cryptographic operations are, however, useful for the CTR encryption scheme of process 500. First, the receiving device 144 uses output data from the LFSR in the sending device 104 to identify whether the state of the LFSR in the receiving device 144 is synchronized with the state of the LFSR in the sending device 104. Second, the LFSR provides a predetermined period between generations of a repeated output numbers. For example, an appropriately configured 64-bit LFSR has a period of $2^{64}-1$ outputs before a single output value is repeated. Thus, the sending device 104 and receiving device 144 use an LFSR for a predetermined number of outputs without requiring additional checks to guarantee that a LFSR output number has not been used in a previous message.

Referring again to FIG. 5, the sending device 104 generates a first pseudo-random number with the initialized PRNG (block 506). In the sending device 104, the PRNG 112 is either a dedicated hardware device, or the processor 108 executes stored instructions to implement the PRNG. The output number is, for example, a numeric value represented by 64-bits of data. Process 500 continues as the sending device encrypts a nonce with the output of the PRNG, the shared key, and the encryption algorithm (block 508), XORs the nonce with plain text data to generate cipher text data (block 512), optionally generates a MAC and encrypts the state of the PRNG (block 516), and sends a message to the receiving device 144 that includes the cipher text and the full state of the PRNG (block 520). In a pre-generation embodiment, the full state of the PRNG is the state of the PRNG 112 prior to generating the pseudo-random number as described with reference to block 506, while in a post-generation embodiment the full state of the PRNG 112 is the state of the PRNG 112 after generating the pseudo-random number as described with reference to block 506, which is the expected state for the PRNG 152 in the receiving device after generation of the same pseudo-random number. The processing described above with reference to blocks 508-520 of process 500 is substantially the same as the processing described above with reference to blocks 208-220 of process 200, with the exception that process 500 uses the output of the PRNG 112 for encryption of the nonce, and sends the internal state of the PRNG 112 to the receiving device 144 instead of sending the full value of a counter.

After generating each set of cipher text data, the sending device 104 generates the next pseudo-random number with the PRNG 112 (block 524), and the processor 108 identifies intermediate state data corresponding to a change of state in the PRNG 112 that occurs when the next pseudo-random number is generated (block 528). The identification of the intermediate data in the processing described with reference to block 528 uses one of the pre-generation or post-generation configurations describe above with reference to the processing of block 520. In the LFSR PRNG 112 of the sending device 104, the internal state of the LFSR is updated by XORing two or more bits together to generate a shift bit. The LFSR is preconfigured with two or more "taps" that select different bits from the internal state vector to generate the shift bit using one or more XOR operations. The entire contents of the LFSR are shifted by a single bit, typically by removing the least-significant bit in the LFSR state vector, and the shift bit is placed in the open bit in the LSFR state vector. Thus, in one embodiment, the intermediate state data generated for each pseudo-random number in the LFSR is the binary value represented by the single shift bit. The intermediate state data for a series of N previously generated pseudo-random numbers are be represented by an N bit vector of shift bits used to generate the previous N numbers in another configuration. In an alternative embodiment, the intermediate state data represent a counter indicating the number of pseudo-random numbers that the PRNG 112 in the sending device 104 has generated since the sending device 104 last sent the entire state of the PRNG 112 to the receiving device 144. In either embodiment, the intermediate state data are represented by a smaller number of bits than are used to represent the full state of the PRNG that is sent to the receiving device 144 as described with reference to the processing of block 520.

Process 500 continues as the processor 108 in the sending device 104 encrypts another nonce using the next pseudo-random number from the PRNG 112 and the shared key (block 532). The processor 108 XORs the nonce with plain text data in a next data message (block 536) and optionally generates a MAC, encrypts the intermediate state data, or both with a second shared key (block 540). The processing described with reference to blocks 532-540 is similar to the processing described with reference to blocks 508-516, but the processor 108 uses the modified counter to generate a different nonce and the sending device 104 generates a MAC for the message and encrypted binary data for the intermediate state data instead of for the full value of the counter.

After generating the intermediate state data, cipher text, and optional MAC data, the sending device 108 sends the cipher text for the next message and the intermediate state data to the receiving device 144 (block 544). Process 500 continues with the processing described with reference to blocks 524-544 above until a maximum predetermined number of messages are sent that include only the intermediate state data instead of the full state of the PRNG (block 548). The intermediate state data included with each message enables the receiving device 144 to confirm that the state of the corresponding PRNG 152 in the receiving device 144 is synchronized with the state of the PRNG 112 in the sending device 104. As with the intermediate state data in the process 200, the intermediate state data sent in the process 500 reduce the total number of bits that the sending device 104 sends to the receiving device 144 while maintaining synchronization between the PRNG 112 and PRNG 152.

During process 500, the sending device 104 continues to send encrypted messages that include the intermediate state data as described above with reference to the processing of blocks 524-544 until a predetermined maximum number of messages have been sent (block 548). As described above, the predetermined maximum number of messages is typically the total number of unique intermediate states that can be represented by the intermediate state data, such as 5 values for a set of 5 shift bits from the PRNG 112, or 32 values in 5 bits of intermediate state data that store a count of the pseudo-random numbers that the PRNG 112 has generated since the full state of the PRNG 112 was last sent to the receiving device. Process 200 subsequently generates another pseudo-random number with the PRNG 112 (block 550) in the same manner described above with reference to the processing of block 524, and returns to the processing described with reference to block 508 to generate another encrypted message that includes the full state vector of the PRNG 112. Process 500 continues as the sending device 104 sends additional messages to the receiving device 144. If the sending device 104 eventually sends messages using every unique value in the PRNG, then the sending device 104 generates a new key, and the sending device 104 and receiving device 144 use the new shared key to continue communication as described in process 500.

Figure 6:
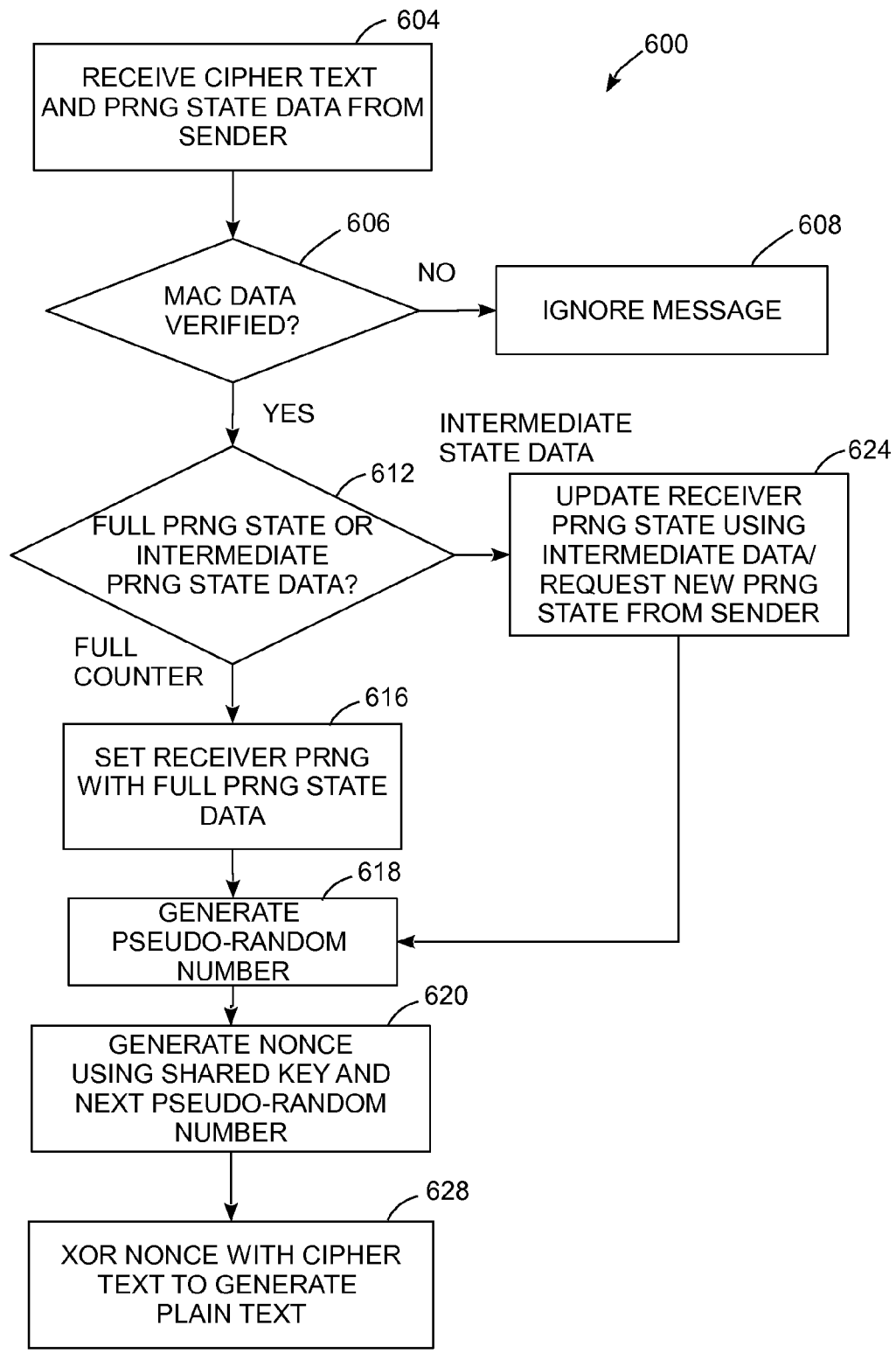
FIG. 6 is a block diagram of another counter mode decryption scheme used with the receiving device in the network of FIG. 1.

In the system 100, the sending device 104 sends encrypted messages to the receiving device 144 as described above with reference to the process 500. The receiving device 144 decrypts the encrypted messages to recover the plain text data in each message. FIG. 6 depicts a process 600 for decryption of the encrypted messages. FIG. 6 is described in conjunction with the embodiment of FIG. 1 and the receiving device 144 for illustrative purposes. In the discussion below, a reference to the process 600 performing a function or action refers to one or more processors, such as the processor 148, executing programmed instructions stored in a memory to operate components to perform the function or action.

Process 600 begins when the network device 156 in the receiving device 144 receives an encrypted message including cipher text and binary state data for the PRNG in the sending device 104 (block 604). If the cipher text message includes an optional MAC, then the receiving device 144 verifies the contents of the encrypted message using the MAC (block 606). The receiving device verifies the message using the MAC and optionally decrypts the PRNG state data in the same manner as described above with reference to the processing of block 306 in process 300. If the MAC does not properly correspond to the message, then the receiving device ignores the message (block 608) and does not continue with further processing and decryption of the message.

If the MAC data are verified, then process 600 continues as the receiving device 144 identifies whether the message includes either the full state vector of the PRNG 112 in the sending device 104, or intermediate state data corresponding to the PRNG 112 (block 612). As described above, the full PRNG state data include a larger number of bits to represent the full state vector for the PRNG and the intermediate state data include a smaller number of bits to represent changes to the state of the PRNG 112 in the sending device 104 that have occurred since the previous transmission of the full PRNG state. In a configuration where the full PRNG state includes 64 bits of data and the intermediate state data include 5 bits of data, the processor 148 can distinguish between a full PRNG state vector or intermediate state data with reference to the length of the state data, or with reference to additional flags and option data that are included in the message.

If the message includes the full data corresponding to the counter in the sending device 104, then the receiving device 144 sets the state of the receiver PRNG 152 to the value of the full PRNG state vector data (block 616). As described above, a PRNG 152 implemented in hardware includes internal registers that store the PRNG state, and a PRNG implemented in software stores the PRNG state data in the memory 164.

If the message includes the intermediate PRNG state data, then the processor 148 modifies a counter that is stored in the counter memory 164 with reference to the contents of the intermediate state data (block 624). For example, in one embodiment the intermediate state data include one or more shift bits corresponding to shift bits used to generate the previous pseudo-random numbers in the sending device 104. The receiving device 144 compares the intermediate state data to the corresponding number of shift bits used to update the PRNG 152 to identify whether a discrepancy exists between the state of the LFSR 112 in the sending device 104 and the LFSR 152 in the receiving device 144. As described above, the processor 148 in the receiving device 144 can identify the full state of the LFSR 112 in the sending device 104 after receiving 2m bits of intermediate state data from the sending device 104 for an m-bit PRNG state vector. If some messages are lost during transmission from the sending device 104, the receiving device 144 uses the intermediate state data to update the PRNG 152 to remain in synchronization with the PRNG 112 in the sending device 104. Alternatively, the receiving device 144 sends a message to the sending device 104 if the intermediate state data do not include sufficient state information to enable the receiving device 144 to synchronize the PRNG 152 with the state of the PRNG 112 in the sending device.

In a pre-generation configuration of the process 600, the PRNG 152 is updated with either the full state of the PRNG 112 or the intermediate state data in the sending device 104 just prior to the generation of the PRNG in the sending device 104 that is used to encrypt the cipher text in the message. The receiving device 154 generates a new pseudo-random number with the PRNG 152 that corresponds to the pseudo-random number used to generate the nonce for the cipher text (block 618). In a post-generation configuration, the state data include the state of the PRNG in the sending device 104 just after generation of the pseudo-random number that is used to generate the cipher text in the message. In the post-generation configuration, the receiving device copies the bits in the internal state vector of the LFSR in the PRNG 152 as the generated pseudo-random number without having to expressly use the LFSR to generate the next pseudo-random number (block 618). In either a pre-generation or post-generation configuration, the receiving device 144 generates the same pseudo-random number that was used to generate the encryption nonce used to generate the cipher text in the sending device 104.

Process 600 continues as the receiving device 144 uses the generated pseudo-random number, the shared encryption key, and the encryption algorithm to generate the same nonce that the sending device 104 used to encrypt the message (block 620). In the CTR mode encryption scheme described with reference to FIG. 5 and FIG. 6, the sending device 104 and the receiving device 144 both use the shared key and the pseudo-random number to perform an encryption operation to generate the nonce.

In process 600, the processor 148 in the receiving device 144 does not perform a decryption operation directly, but instead generates the nonce using the encryption operation with the same key and counter that the sending device 104 uses during encryption. To decrypt the cipher text data, the receiving device 144 applies the generated nonce to the cipher text data in an XOR operation (block 628). As is known in the art, the XOR operation using the nonce applied the plain text generates the cipher text, and another XOR operation using the same nonce applied to the cipher text returns the plain text. For example, if the plain text is "0110" and the nonce is "1011" then the sending device 104 generates cipher text: 0110⊗1011→1101. The receiving device 144 generates the same nonce, "1011," and XORs the cipher text with the nonce to recover the plain text: 1101⊗1011→0110.

Figure 7:
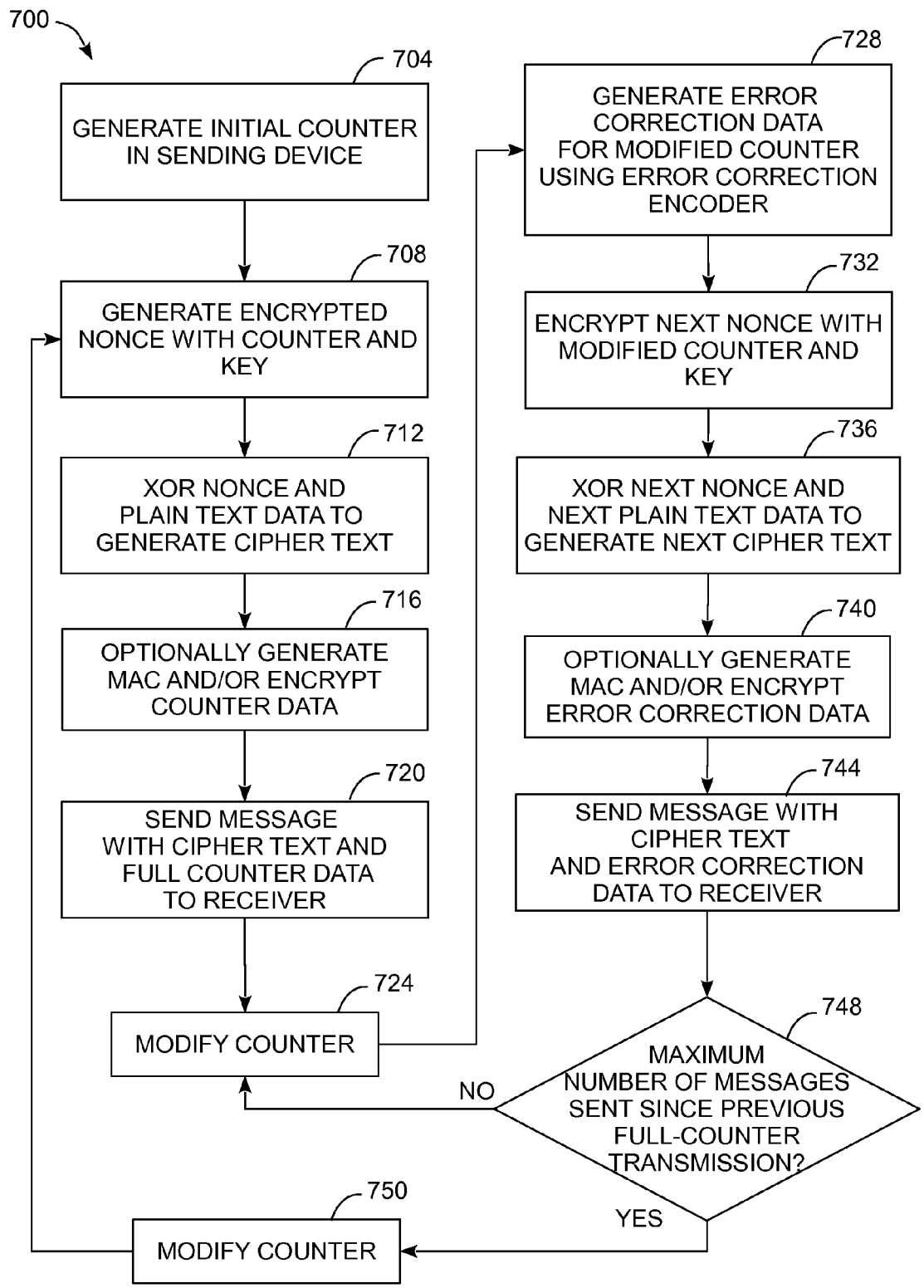
FIG. 7 is a block diagram of another counter mode encryption scheme used with the sending device in the network of FIG. 1.

FIG. 7 depicts another embodiment of a counter mode encryption scheme 700 in a device that sends encrypted messages to a receiving device. FIG. 7 is described in conjunction with the embodiment of FIG. 1 and the sending device 104 for illustrative purposes. In the discussion below, a reference to the process 700 performing a function or action refers to one or more processors, such as the processor 108, executing programmed instructions stored in a memory to operate one or more components to perform the function or action. Process 700 is described in the context of a system where the sending device, such as Alice 104, and the receiving device, such as Bob 144, both have a shared cryptographic key stored in the key memories 130 and 170, respectively. Additionally, both devices implement a predetermined cryptographic algorithm such as, for example, the Rijndael algorithm used in AES, the Blowfish algorithm, the Twofish algorithm, or any other suitable symmetric encryption algorithm. The sending device and receiving device can use secure key generation and exchange techniques that are known to the art to generate the shared key and exchange the key so that the attacker Eve 174 does not have access to the shared key.

Process 700 begins as the sending device generates initial counter data (block 704), generates an encrypted nonce with the counter and the private key (block 708), applies the nonce to plain text data to generate cipher text data (block 712), optionally generates a MAC or encrypted version of the counter data (block 716), sends a message including the cipher text and the full counter data to the receiving device (block 720), and modifies the counter data (block 724). The processing of blocks 704-724 in the process 700 is performed in substantially the same manner as described above with reference to the processing described in blocks 204-224, respectively, in process 200.

Process 700 continues as the sending device generates error correction data for the modified counter using an error correction encoder (block 728). In the system 100, the sending device 104 implements the error correction encoder using software instructions that are executed using the processor 108, while in another embodiment the processor 108 includes dedicated hardware modules that perform the error correction encoding process. Examples of error correction encoders that are known to the art include, but are not limited to, cyclical redundancy check (CRC) codes, Hamming, low-density parity-check, turbo, convolutional, Reed-Solomon, and Reed-Muller codes. The error correction codes include the generation of redundant data that corresponds to the original message data, which includes the counter data in the sending device 104. As is known in the art, the redundant error correcting code data enables identification and correction of some errors in the original message data. The errors typically occur during transmission of the message. The number of bits in the generated error correction code is less than the number of bits in the full counter. For example, if the full counter is a 64-bit number, then an example CRC code error correction code that is configured to correct up to five single-bit errors in the 64-bit counter is generated using only 15 bits. Instead of sending the full counter value and the error correction data, the sending device 104 only transmits the error correction data as part of the cipher text message that is send to the receiving device 144.

Process 700 continues as the processor 108 in the sending device 104 encrypts another nonce using the modified counter value and the shared key (block 732). The processor 108 XORs the nonce with plain text data in a next data message (block 736) and optionally generates a MAC, encrypts the error correction code data, or both with a second shared key (block 740). The processing described with reference to blocks 732-740 is similar to the processing described with reference to blocks 708-716, but the processor 108 uses the modified counter to generate a different nonce and the sending device 104 generates a MAC for the message and encrypted binary data for the error correction data instead of for the full value of the counter.

After generating the error correction data, cipher text, and optional MAC data, the sending device 108 sends the cipher text for the next message and the intermediate state data to the receiving device 144 (block 744). Process 700 continues with the processing described with reference to blocks 724-744 above until a maximum predetermined number of messages are sent that include only the error correction data instead of the full counter data (block 748).

Process 700 continues as the sending device 104 sends additional messages to the receiving device 144. After a predetermined number of messages are sent that include only the error correction code data (block 748), then the processor 108 in the sending device 104 increments the counter value (block 750) and returns to the processing described above with reference to the blocks 708-724 to send the next message including the cipher text and data corresponding to the full counter value. If the sending device 104 eventually sends messages using every possible counter value, then the sending device 104 generates a new key and the sending device 104 and receiving device 144 use the new shared key to continue communication as described in process 700.

Figure 8:
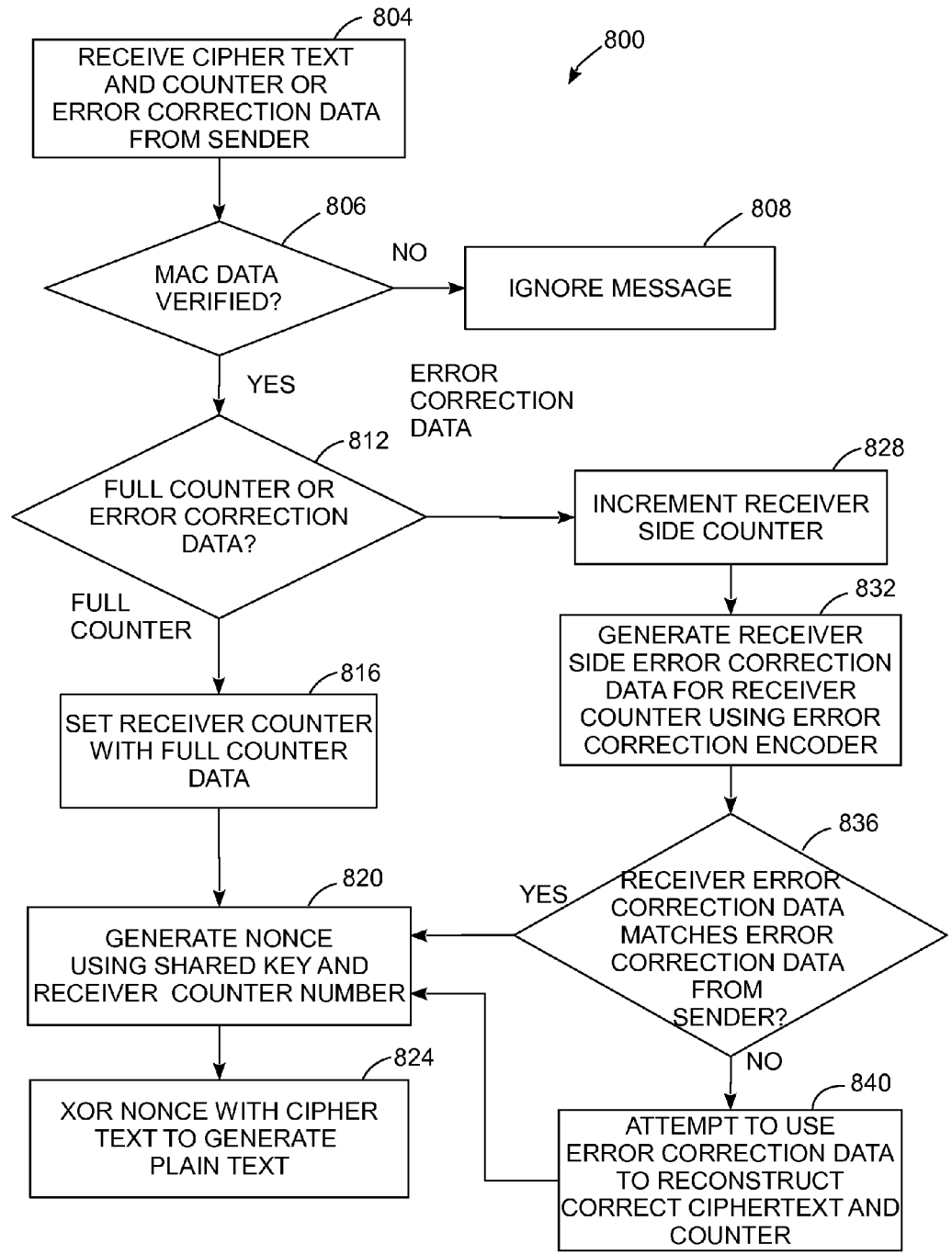
FIG. 8 is a block diagram of another counter mode decryption scheme used with the receiving device in the network of FIG. 1.

FIG. 8 depicts a block diagram of a process 800 for decryption of the encrypted messages that are generated and transmitted using the process 700 described above. FIG. 8 is described in conjunction with the embodiment of FIG. 1 and the receiving device 144 for illustrative purposes. In the discussion below, a reference to the process 800 performing a function or action refers to one or more processors, such as the processor 148, executing programmed instructions stored in a memory to operate components to perform the function or action.

Process 800 begins when the network device 156 in the receiving device 144 receives an encrypted message including cipher text and binary counter data from the sending device 104 (block 804). If the cipher text message includes an optional MAC, then the receiving device 144 verifies the contents of the encrypted message using the MAC (block 806). The processor 148 in the receiving device 144 verifies the MAC using a shared verification key stored in the key memory 170 to verify that the contents of the message correspond to the MAC. The verification key is different than the shared encryption/decryption key that the receiving device 144 uses to decrypt the contents of the message. In one embodiment, the verification keys and decryption keys are two sub-keys that are generated from a single parent key that is shared between the sending device 104 and receiving device 144. In some embodiments, the message includes counter data that are encrypted using the verification key, and the receiving device decrypts the counter data using the verification key as well. If the MAC does not properly correspond to the message, then the receiving device ignores the message (block 808) and does not continue with further processing and decryption of the message. In some embodiments, the receiving device 144 sends a message to the sending device 104 indicating that a received message did not correspond to the MAC. The sending device 104 optionally retransmits the corrupted message, or sends a new message including the full counter data to the receiving device to re-synchronize the state of the two devices.

If the MAC data are verified, then process 800 continues as the receiving device 144 identifies whether the message includes either the full counter data or the error correction data corresponding to the counter (block 812). If the message includes the full data corresponding to the counter in the sending device 104, then the receiving device 144 sets an internal counter, which is stored in the counter memory 164, to the value of the full counter data (block 816). The processor 148 generates the encryption nonce using the shared key and the internal counter number (block 820), and applies the nonce to decrypt the cipher text in the message using the nonce (block 824).

During process 800, if the processor 148 in the receiving device 144 identifies that the message includes the error correction data from the sending device 104 (block 812), then the processor 148 increments the counter data in the receiving device (block 828), and generates receiver side error correction data (block 832). The receiving device 144 increments the counter and generates the error correction data using the same processes as used in the sending device 104 to maintain synchronization between the counters and error correction data between the sending device 104 and the receiving device 144.

During process 800, if the receiving device 144 generates binary error correction data for the internal receiving device counter that match the binary data values in the error correction code data that are included in the cipher text message (block 836), then the internal counter for the receiving device 144 is synchronized with the counter value in the sending device 104 that generated the cipher text message. The process 800 continues to the processing of blocks 820-824 as described above to enable the receiving device to decrypt the cipher text message from the sending device. In many error correction encoding systems, the computational complexity for generating the error correction code is lower than the computational complexity for using the error correction code data to correct corrupted data. If the counter in the sending device is synchronized with the counter in the receiving device and if the error correction code data reach the receiver without corruption, then the error correction code data between the sending device 104 and the receiving device 144 match, and the receiving device continues with decrypting the message.

In some instances, the receiving device 144 receives error correction data with a cipher text message that do not match the error correction code data that are generated for the internal counter in the receiving device (block 836). Reasons for the inconsistency in the error correction data include dropped messages that fail to reach the receiving device 144, corrupted data in the cipher text message, and out of order delivery of messages from the sending device 104 to the receiving device 144. The process 800 optionally uses the error correction data to reconstruct the counter that was used to generate the encrypted message (block 840). For example, the receiving device 144 performs an error correction process to correct one or more bits of binary data in the error correction data that may have been corrupted during transmission through the network 102.

In another configuration, the receiving device optionally generates error correction data for a set of counter values that correspond to expected counter values used in the sending device 104. For example, if the receiving device 144 successfully receives a cipher text message with a counter value of 1,000, then the receiving device 144 generates error correction data for counter values of 1,001-1,010 and identifies if the error correction data in the cipher text message corresponds to any of the counter values in the predetermined range. If the sending device succeeds in compensating for the inconsistency in the error correction data, then the processor 148 generates the nonce for the cipher text and applies the nonce to the cipher text to generate plain text. The receiving device 144 adjusts the internal counter to compensate for the missed messages, or transmits an error message to the sending device 104.

In another configuration of the process 800, the receiving device 144 maintains synchronization of the counter by reconstructing the error correction information sent by the sending device 144 and checking that the error correction data and counter match. In the even that the data do not match, the receiving device 144 selects the error correction information sent by the sender and within a certain limit of previously transmitted messages. For example, the receiving device 144 checks the error correction counter data from the previous five or ten messages, where the number of previous messages that are analyzed remains below the total number of intermediate messages that are sent after a transmission of the full counter value. The receiving device 144 determines if the intermediate counters include sufficient data to generate error correction information that matches the error correction information received in the most recent message. This enables re-synchronization within a certain message count limit if a message is lost during transmission and the receiving device 144 receives a subsequent message from the sending device 104.

In some instances, the receiving device 144 receives a message from the sending device 104, but a portion of the error correction code data that corresponds to the intermediate counter value is corrupted. In one configuration, if the receiving device 144 receives an error correction code (ECC) that does not match the ECC generated for the local counter in the receiving device, then the receiving device identifies how many bit errors have been identified in the received ECC in comparison to the locally generated ECC. If the number of bit errors are less than or equal to the total number of errors for which the ECC is configured to provide corrections (e.g. up to five single-bit errors in a 15 bit CRC error code embodiment), then the receiving device 144 accepts the ECC code from the sender with the errors. The receiving device 144 accepts up to the predetermined number of bit errors in the code with the errors being attributed to noise in the communication network 102. If the number of errors exceed the predetermined maximum number of bit errors that can be corrected by the ECC, then the receiving device 144 identifies that a message has been lost and attempts to resynchronize based on previously received messages, or contacts the sending device 104 to request the full counter data.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for encrypted communication comprising:
    generating with a sending device a first counter value being represented by a first predetermined number of bits;
    generating with a cryptographic key and the first counter value in the sending device a first nonce;
    applying with the sending device the first nonce to first plain text data to generate first cipher text data;
    sending with the sending device a first message including binary data corresponding to the first cipher text data and the first counter value to a receiving device for decryption of the first cipher text data;
    modifying with the sending device the first counter value by a predetermined amount to generate a second counter value;
    identifying with the sending device intermediate state data corresponding to a change between the first counter value and the second counter value, the intermediate state data being represented by a second number of bits, the second number of bits being less than the first number of bits;
    generating with the cryptographic key and the second counter value in the sending device a second nonce;
    applying with the sending device the second nonce to second plain text data to generate second cipher text data; and
    sending with the sending device a second message including binary data corresponding to the second cipher text data and the intermediate state data to the receiving device for decryption of the second cipher text data.

2. The method of claim 1, the intermediate state data being a numeric difference value between the first counter value and the second counter value.

3. The method of claim 1, the intermediate state data being a number of messages sent from the sending device to the receiving device subsequent to sending the first message.

4. The method of claim 1, the decryption of the second cipher text data with the receiving device further comprising:
    modifying with the receiving device the first counter value with reference to the intermediate state data sent from the sending device to generate the second counter value in the receiving device;
    generating with the cryptographic key and the second counter value in the receiving device the second nonce; and
    decrypting with the receiving device the second cipher text with the second nonce to generate the second plain text in the receiving device.

5. The method of claim 1 further comprising:
    concatenating with the sending device the second counter value and the intermediate state data to generate a concatenated counter value; and
    generating with the cryptographic key and the concatenated counter value in the sending device the second nonce.

6. The method of claim 5, the decryption of the second cipher text data with the receiving device further comprising:
    modifying with the receiving device the first counter value by the predetermined amount to generate the second counter value in the receiving device;
    concatenating with the receiving device the second counter value and the intermediate state data to generate the concatenated counter value in the receiving device;
    generating with the cryptographic key and the concatenated counter value in the receiving device the second nonce; and
    decrypting with the receiving device the second cipher text with the second nonce to generate the second plain text in the receiving device.

7. The method of claim 6, the decryption of the second cipher text occurring only if a sum of the first counter value and the predetermined amount is equivalent to a sum of the first counter value and intermediate state data.

8. The method of claim 1, the identification of the intermediate state data further comprising:
    identifying the second number of bits representing the intermediate state data as least significant bits representing the second counter value.

9. The method of claim 1, the sending of the first cipher text data and the first counter value to the receiving device further comprising:
    encrypting with another cryptographic key in the sending device the first counter value to generate an encrypted first counter value; and
    sending with the sending device the first message including the binary data corresponding to the first cipher text data and the encrypted first counter value to the receiving device for decryption.

10. The method of claim 1 further comprising:
    generating with another cryptographic key in the sending device a first message authentication code corresponding to the first cipher text and the first counter value;
    sending with the sending device binary data corresponding to the first message authentication code to the receiving device in association with the first cipher text and first counter value;
    generating with the other cryptographic key in the sending device a second message authentication code corresponding to the second cipher text; and
    sending with the sending device binary data corresponding to the second message authentication code to the receiving device in association with the second cipher text and intermediate state data.

11. The method of claim 10, wherein the cryptographic key and the other cryptographic key are both derived from a single parent cryptographic key, the single parent cryptographic key being stored in a memory in the sending device and in another memory in the receiving device.

12. The method of claim 1 further comprising:
    modifying with the sending device the first counter value by another predetermined amount to generate a third counter value;
    identifying with the sending device a number of messages sent from the sending device to the receiving device subsequent to sending the first message;

generating with the cryptographic key and the third counter value in the sending device a third nonce;

applying with the sending device the third nonce to third plain text data to generate third cipher text data;

sending with the sending device binary data corresponding to a third message including the third cipher text data and the third counter value to a receiving device for decryption of the third cipher text data in response to the identified number of messages being greater than a predetermined threshold.

13. A method for encrypted communication comprising:

initializing with a sending device a pseudo-random number generator with state data generated in the sending device, the state data including a first predetermined number of bits;

generating with the pseudo-random number generator in the sending device a first pseudo-random number;

generating with a cryptographic key and the first pseudo-random number in the sending device a first nonce;

applying with the sending device the first nonce to first plain text data to generate first cipher text data;

sending with the sending device binary data corresponding to a first message including the first cipher text data and the state data to a receiving device for decryption of the first cipher text data;

generating with the pseudo-random number generator in the sending device a second pseudo-random number;

identifying with the sending device intermediate state data corresponding to a change in the state of the pseudo-random number generator during generation of the second pseudo-random number, the intermediate state data having a second number bits, the second number of bits being less than the first number of bits;

generating with the cryptographic key and the second pseudo-random number in the sending device a second nonce;

applying with the sending device the second nonce to second plain text data to generate second cipher text data; and sending with the sending device binary data corresponding to a second message including the second cipher text data and the intermediate state data to the receiving device for decryption of the second cipher text data.

14. The method of claim 13, the generating of pseudo-random numbers with the pseudo-random number generator in the sending device further comprising:

generating the pseudo-random numbers with a linear feedback shift register.

15. The method of claim 14, the identification of the intermediate state data further comprising:

identifying with the sending device a single bit of the second pseudo-random number generated by the linear feedback shift register as the intermediate state data.

16. The method of claim 15, further comprising:

receiving with the receiving device the single bit of the intermediate state data from the sending device;

identifying with the receiving device an expected state of a linear feedback shift register in the sending device with reference to the single bit and a plurality of single bits corresponding to a plurality of pseudo-random numbers generated in the sending device received in previous messages from the sending device;

generating with a linear feedback shift register in the receiving device the second pseudo-random number for use in decrypting the second cipher text only in response to the expected state of the linear feedback shift register in the sending device corresponding to a predetermined state of the linear feedback shift register in the receiving device.

17. The method of claim 13, the decryption of the second cipher text data with the receiving device further comprising:

configuring a pseudo-random number generator in the receiving device with the state of the pseudo-random number generator received from the sending device;

generating with the pseudo-random number generator in the receiving device the second pseudo-random number;

generating with the cryptographic key and the second pseudo-random number in the receiving device the second nonce; and decrypting with the receiving device the second cipher text with the second nonce to generate the second plain text in the receiving device.

18. The method of claim 13 further comprising:

generating with another cryptographic key in the sending device a first message authentication code corresponding to the first cipher text and the state data;

sending with the sending device binary data corresponding to the first message authentication code to the receiving device in association with the first cipher text and state data;

generating with the other cryptographic key in the sending device a second message authentication code corresponding to the second cipher text; and sending with the sending device binary data corresponding to the second message authentication code to the receiving device in association with the second cipher text and intermediate state data.

19. The method of claim 18, wherein the cryptographic key and the other cryptographic key are both derived from a single parent cryptographic key, the single parent cryptographic key being stored in a memory in the sending device and in another memory in the receiving device.

20. A method for encrypted communication comprising:

generating with a sending device a first counter value being represented by a first predetermined number of bits;

generating with a cryptographic key and the first counter value in the sending device a first nonce;

applying with the sending device the first nonce to first plain text data to generate first cipher text data;

sending with the sending device a first message including binary data corresponding to the first cipher text data and the first counter value to a receiving device for decryption of the first cipher text data;

modifying with the sending device the first counter value by a predetermined amount to generate a second counter value;

generating with the sending device first error correction data corresponding to the second counter value, the first error correction data being represented by a second number of bits, the second number of bits being less than the first number of bits;

generating with the cryptographic key and the second counter value in the sending device a second nonce;

applying with the sending device the second nonce to second plain text data to generate second cipher text data; and sending with the sending device a second message including binary data corresponding to the second cipher text data and the first error correction data to the receiving device for decryption of the second cipher text data.

21. The method of claim 20, the decryption of the second cipher text data with the receiving device further comprising:

modifying with the receiving device the first counter value by the predetermined amount to generate the second counter value in a memory of the receiving device;

generating with the receiving device second error correction data corresponding to the second counter value;

generating with the cryptographic key and the second counter value in the receiving device the second nonce in response to the second error correction data matching the first error correction data received from the sending device; and decrypting with the receiving device the second cipher text with the second nonce to generate the second plain text in the receiving device.

22. The method of claim 20, the decryption of the second cipher text data with the receiving device further comprising:

modifying with the receiving device the first counter value by the predetermined amount to generate the second counter value in a memory of the receiving device;

generating with the sending device second error correction data corresponding to the second counter value;

generating the second counter value with a predetermined error correction process applied to the first error correction data in response to the first error correction data failing to match the second error correction data;

decrypting with the receiving device the second cipher text with the third nonce to generate third plain text in the receiving device.

* * * * *